United States Patent
Heffelfinger et al.

(10) Patent No.: US 7,948,184 B2
(45) Date of Patent: May 24, 2011

(54) VEHICLE TESTING LAMP APPARATUS, SYSTEM, AND METHOD

(75) Inventors: David M. Heffelfinger, Sequim, WA (US); David A. Pringle, Los Angeles, CA (US); David B. McDonald, Santa Clarita, CA (US); Ashot Nalbandyan, Granada Hills, CA (US)

(73) Assignee: Luminys Systems Corp., Hollywood, CA (US)

( * ) Notice: Subject to any disclaimer, the term of this patent is extended or adjusted under 35 U.S.C. 154(b) by 903 days.

(21) Appl. No.: 11/906,573

(22) Filed: Oct. 2, 2007

(65) Prior Publication Data
US 2008/0116814 A1    May 22, 2008

Related U.S. Application Data

(60) Provisional application No. 60/848,664, filed on Oct. 2, 2006.

(51) Int. Cl.
   *B60Q 1/14* (2006.01)
(52) U.S. Cl. .......................... 315/77; 315/82
(58) Field of Classification Search .................. 315/77, 315/82, 209 R, 160, 172, 224, 291, 306, 307, 315/308
   See application file for complete search history.

(56) References Cited

U.S. PATENT DOCUMENTS

| | | | |
|---|---|---|---|
| 4,866,390 A | | 9/1989 | Butchko |
| 5,150,012 A | * | 9/1992 | Pringle et al. ............. 315/200 A |
| 5,499,182 A | * | 3/1996 | Ousborne ....................... 701/35 |
| 5,604,439 A | | 2/1997 | Walkington et al. |
| 6,066,951 A | | 5/2000 | Maass |
| 6,157,144 A | | 12/2000 | Galt et al. |
| 2005/0007031 A1 | * | 1/2005 | Hyder ............................ 315/276 |
| 2006/0164534 A1 | | 7/2006 | Robinson et al. |

FOREIGN PATENT DOCUMENTS

JP    2001239452    2/2003

* cited by examiner

*Primary Examiner* — Douglas W Owens
*Assistant Examiner* — Jianzi Chen
(74) *Attorney, Agent, or Firm* — Cislo & Thomas, LLP

(57) ABSTRACT

A vehicle testing lamp system comprising an onboard controller unit, an off-board controller unit, and a lamp fixture. The onboard controller unit comprises a solid state relay, the solid state relay being switchable between an idle output power setting and a high output power setting; a timing circuit,; a transfer circuit; a current sensor; a current regulator; and batteries or other auxiliary power supply. The off-board controller unit comprises a power supply electrically connected to a voltage booster circuit. The lamp fixture comprises an ignitor; a shock mount; and a lamp that is electrically connected to the igniter. The off-board controller supplies power to the lamp at its idle level. The onboard transfer circuit permits the off-board power supply to be disconnected while the onboard controller unit maintains the lamp at idle, and the onboard timing circuit limits the time that the lamp remains at high output. Also disclosed is a method for using a vehicle testing lamp system.

23 Claims, 27 Drawing Sheets

FIG. 10M
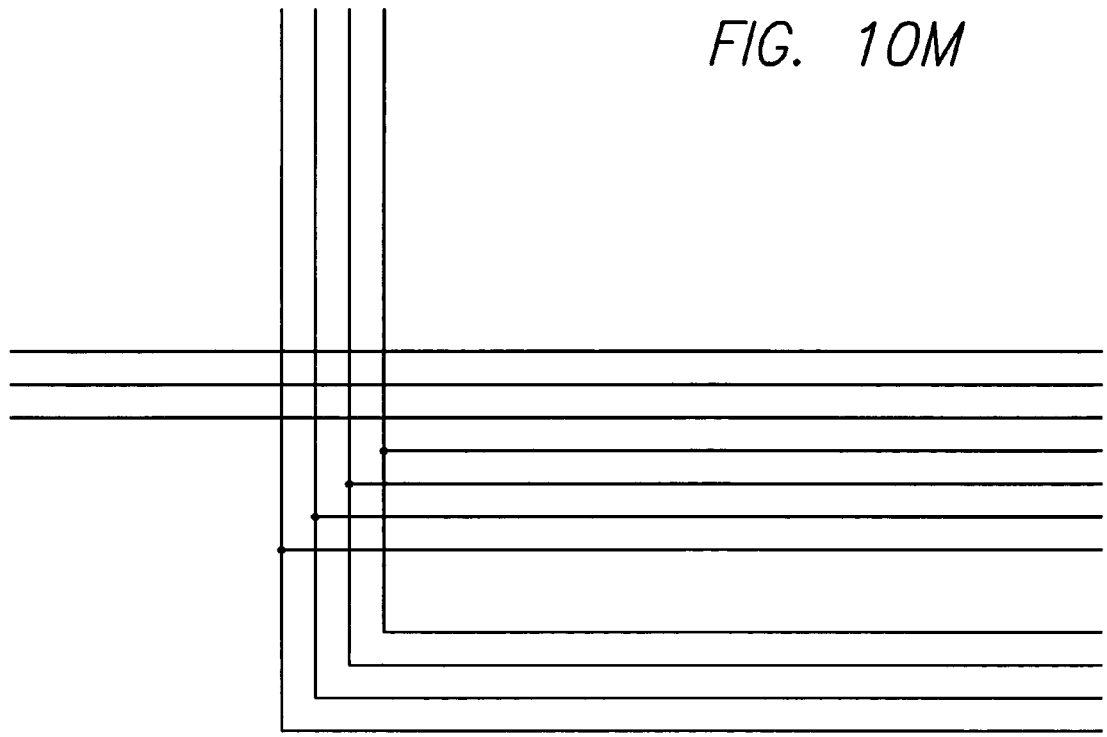
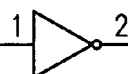
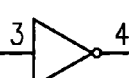
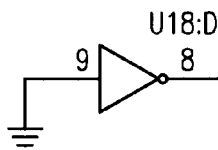
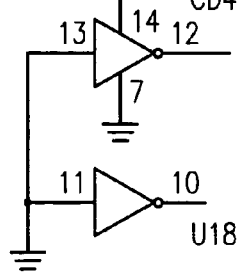

VEHICLE TESTING LAMP APPARATUS, SYSTEM, AND METHOD

CROSS-REFERENCES TO RELATED APPLICATIONS

This patent application claims the benefit of U.S. Provisional Application Ser. No. 60/848,664 filed Oct. 2, 2006, for Vehicle Testing Lamp Apparatus, System, and Method, which application is incorporated in its entirety here by this reference.

TECHNICAL FIELD

This invention relates to lighting systems for high speed image capture, particularly, to lighting systems used to capture vehicle safety tests.

BACKGROUND ART

Vehicle safety image capture represents a class of video applications characterized by high speed image capture, short event times, and high shock forces. Other applications in this class include safety component testing, and aerospace safety testing. With high speed image capture, frame rates can be less than one millisecond. Moreover, shutter times are even shorter than the frame rate in order to reduce blurring of moving objects in the field of view. Shutter times of less than 300 microseconds are common. In turn, the trend for high speed video is to move from film to charge coupled device (CCD) sensors, and from CCD to complementary metal oxide semiconductor (CMOS) sensors which have less sensitivity. Both short shutter times and reduced sensitivity require very high intensity lighting. It is an object of this invention to provide very high intensity lighting capable of surviving the high shock forces involved in vehicle safety testing.

Another requirement for vehicle safety testing is that equipment must be as light weight as possible for equipment mounted onboard a vehicle during safety testing that involves a vehicle in motion. For high speed image capture that is performed within the cabin of the vehicle, power is generally supplied by onboard batteries, and all necessary equipment to power the lighting, such as power supplies and controllers, must be carried onboard. Therefore, while the efficiency of the lamp technology is important, as measured in lumens per watt, the weight of the equipment required to produce a given value of lumens is the critical ratio. A useful figure of merit in this regard is lumens per kilogram, i.e. the value of lumens that can be produced as a ratio to the weight of equipment needed to power the light (power to weight ratio). It is an object of this invention to provide a ratio of lumens per kilogram greater than 5500.

Current lamp technologies that are used in car safety testing include incandescent and metal halide lamps. Incandescent lamps use a filament that is heated to a high black body color temperature with either an AC or DC electric current. In car crash safety testing, a color temperature of between 5000 and 6000 Kelvin is desirable, with a preferred temperature of 5300 to 5500 Kelvin which is inclusive of the color temperature of the sun. Incandescent technology has numerous drawbacks in car safety testing. Filaments are sensitive to shock and vibration and may fail during high shock forces. In addition, incandescent lamps are very inefficient and produce less than 25 lumens per watt. This also results in low lumens-to-kilogram ratio. Much of the radiation given off by incandescent lamps is in the form of heat (infrared wavelengths), and this is also not desirable in car safety testing. High heat within the onboard systems can affect other equipment adversely as well potentially as cause combustion of materials.

Another technology used in onboard car safety testing is an electrochemical flash lamp, such as used in camera flashes. A major disadvantage of flash lamps is that it captures only very short events of less than a fraction of a second. This limits the temporal window of the event and results in loss of critical data. A related problem is that there is no possibility of electronically checking if the flash lamp is functional. If the lamp fails, then a very expensive test will have been wasted. As such, it is an object of this invention to provide the ability for electronic checking of the viability of the lamp prior to committing the vehicle to a crash or collision. Furthermore, the chemical explosion can cause onboard fires.

Metal halide is another lamp technology that is used in vehicle safety testing. Comments in this specification about Metal halide will also include other members of the family such as high intensity discharge (HID) and hydrargyrum medium-arc iodide (HMI). Metal halide is relatively more efficient than incandescent technology. And Metal halide lamps can be boosted to slightly higher intensity for a limited time. Metal halide can stay at an elevated intensity for longer periods of time than flash lamps. However, the color temperature and CRI (color rendering index) of these lamps changes when the lamps are boosted and over the life of the lamp, so there can be significant lamp to lamp variation in color temperature. This can be particularly problematic where multiple metal halide lamps are used together, as is common in vehicle safety testing. Therefore, it is an object of this invention to provide a lamp with a generally constant color temperature.

In addition, the metal halide lamp is under a high pressure, and this may result in an explosion when under stress. This can be very problematic in vehicle safety testing, particularly for onboard applications. Metal halide lamps require a relatively long warm-up period, up to five minutes, before reaching full operating levels. In addition, these lamps also require a five to ten minute cool down time prior to re-striking. The time required for warm-up, in particular, reduces the efficiency of vehicle safety testing operations. So, it is an object of this invention to provide a lamp with essentially no warm-up period before reaching full operating levels and it is an object of this invention to provide a lamp that does not explode under foreseeable conditions.

Hydrargyrum medium-arc iodide (HMI) is a lamp technology that has as yet found little application in vehicle safety testing. The HMI arc is a concentrated point source, which can produce significant glare and shadows in video images. In addition, the HMI lamp has very prominent intensity in the green region of the electromagnetic spectrum, which can significantly affect color balance in video systems. HMI lamps also change color with age and have AC flicker. Furthermore, HMI lamps can explode under stress. For all of these reasons, HMI lamps, though relatively efficient, have found limited acceptance in car safety testing.

Xenon short arc is another lamp technology that has as yet found little application in car safety testing. Xenon short arc suffers from some of the deficiencies of HMI technology, including glare, shadows from its point source like arc, and extreme vulnerability to violent explosion under stress. Xenon short arc technology has slightly more efficiency than tungsten, generally less than 35 lumens per watt. Xenon, however, does have excellent color temperature properties.

Xenon long arc technology, while previously not used in the car safety testing market, has the color temperature advantages of Xenon short arc, but does not have the glare and shadow effects due to the fact that the arc is quite long (from approximately ten centimeters to meters in length). In addition, Xenon long arc lamps operate under negative pressure, and so do not explode. Xenon long arc lamps also do not use a fragile filament and so are resistant to high shock forces. Xenon lamps are also more efficient than tungsten lamps, producing up to 50 lumens per watt. Xenon lamps also have a very desirable property that they can go from a very low wattage idle to high boost wattage virtually in an instant, and therefore have essentially no warm up time. Furthermore, color temperature remains basically constant throughout the transition from low to high output levels. For the combination of these desirable factors, xenon long arc technology is the lamp technology used in this invention, and an arc length on the order of greater than ten millimeters is preferred.

It is desirable to have a high ratio of high to low illumination level because high speed image capture of onboard vehicle safety testing requires intense light. Typically, frame rates in vehicle safety testing are 1000 frame per second (fps) and shutter times are less than 500 microseconds. Shutter times are shorter than frame times (1000 fps=frame time of 1000 microseconds) because significant blurring of objects can occur during a single frame. Frame times of less than 500 microseconds are more desirable in order to reduce blurring. The only light that is used by the high speed camera is during the open shutter. As shorter and shorter shutter times are used, the light must become proportionately more intense or contrast will be lost. Therefore, in high speed image capture, in order to maintain the same levels of object to background contrast, the average intensity of the light level must vary inversely with shutter time. On the other hand, intense illumination during the time that vehicle safety testing is being set up and sitting idle for preparation is undesirable because equipment may be adversely affected. Hence, a high ratio of high to low output illumination level is desirable.

It is also desirable to have a large depth of focus in high speed image capture. A large depth of focus allows for the imaging of a larger volume of objects. In general, the amount of light entering a camera system varies as the inverse square of the f-number of the camera lens (this is an approximation that is based on the optical arrangement of a point source at a large distance). As the f-number increases, depth of focus is improved (the exact magnitude of this effect can vary according to the type and quality of lens that is used). As depth of focus is improved by increasing the f-number, light levels must go up by the square of the change in f-number. A two fold increase in f-number would approximately require a four fold increase in the high light output level of the illumination system. Once again, this underlines the desirability of a high ratio of high to low output illumination level in vehicle safety testing.

One major supplier of onboard vehicle safety testing equipment is KHS (K. H. Steuernagel Lichttechnik GmbH). The KHS Boost S Light uses a combination of lamp, battery box, and boost box as the onboard system. This system puts out approximately 500 watts of high level output and 125 watts of idle output. The lamp technology used is metal halide, and all of the comments previously made regarding that technology apply to this system. The weight of the system is 29.5 kg (65 lbs) and the luminous flux at high output is 50,000 lumens, for a lumens-to-kilogram ratio of approximately 1700. It is an object of this invention to produce a lumens-to-kilogram ratio of greater than 5000, and preferably greater than 5500. As previously stated, there is a color shift as well as a degradation of the CRI (color rendering index) that occurs as the KHS lamp goes from idle to the high output level, and there is color shift that occurs from lamp to lamp. This is undesirable when using multiple lamps in the onboard car safety test. The ratio of the high output level to the low output level of the KHS light is about 4:1, which results in a heat load at idle of more than 25% of the high output level. Heat load is undesirable in onboard vehicle safety testing because it can affect the performance of instrumented dummies and other equipment in the cabin. Therefore, it is an object of this invention to produce a ratio of the high output level to the low output level of at least about 12:1 and to have an absolute heat load at low output level of less than a metal halide lamp at 125 watts.

The practice of overdriving long arc xenon lamps for short high duration pulses is known. (See, e.g., Pringle, U.S. Pat. No. 5,150,012.) However, in the past this has been accomplished with only relatively high powered lamps with the ignitor active in the circuit to keep the lamp lit during dimming and with only an AC circuit. This has not been done with a medium arc lamp, nor has it been done with the lamp already lit operating at a low idle state, as described herein.

DISCLOSURE OF INVENTION

The present invention is directed to a vehicle testing lamp system comprising an onboard controller unit, an off-board controller unit, and a lamp fixture.

The onboard controller unit comprises an onboard solid state relay, the onboard solid state relay being switchable between an idle output power setting and a high output power setting; an onboard timing circuit, the onboard timing circuit receiving a trigger pulse; an onboard transfer circuit; an onboard current sensor; an onboard current regulator or limiter, the onboard current regulator limiting the amount of current to the lamp when the onboard solid state relay is in the idle output power setting; and onboard batteries or other energy storage device, the onboard batteries providing electrical power to the onboard solid state relay, onboard timing circuit, onboard transfer circuit, onboard current sensor, and onboard current regulator; wherein the onboard solid state relay, onboard timing circuit, onboard transfer circuit, onboard current sensor, onboard current regulator, and onboard batteries are electrically connected.

The off-board controller unit comprises an off-board power supply electrically connected to an off-board voltage booster circuit.

The lamp fixture comprises an ignitor, the ignitor being closed in a Faraday cage; a shock mount; and a lamp that is electrically connected to the igniter.

The off-board controller supplies power to the lamp at its low (idle) output level and during ignition. The onboard transfer circuit permits the off-board power supply to be disconnected while the onboard controller unit maintains the lamp at idle, and the onboard timing circuit limits the time that the lamp remains at high output.

In a version of the invention, the shock mount has a first shock ring, a second shock ring, and a plurality of springs. The first shock ring encircles a first end of the lamp, and the second shock ring encircles a second end of the lamp. At least three of the plurality of springs position the first end of the lamp essentially centrally within the first shock ring, and at least three of the plurality of springs position the second end of the lamp essentially centrally within the second shock ring. The shock mount thereby provides means for isolating the lamp from the shock of collision in vehicle safety testing.

In one aspect of the invention, the vehicle testing lamp system comprises a plurality of off-board power supplies; a plurality of onboard controller units; a plurality of lamp fixtures; an off-board distribution box; and an onboard distribution box.

One lamp fixture is connected to one onboard controller unit, and the off-board distribution box combines a plurality of output cables from the plurality of off-board power supplies into a single cable. The onboard distribution box demultiplexes the single cable into a plurality of cables, one cable for each onboard controller unit of the plurality of onboard controller units. This distribution box system transmits electrical power from the plurality of off-board power supplies to the plurality of onboard controller units for operating the plurality of lamp fixtures.

A method for lighting a subject for high speed video includes the steps of providing a system as described above; igniting the lamp; supplying idle power to the lamp at an idle output level by the off-board controller unit; disconnecting the off-board controller unit from the onboard controller unit by way of the onboard transfer circuit, the onboard transfer circuit allowing the off-board power supply to be disconnected while the onboard controller unit maintains the lamp at idle; powering the onboard controller unit by way of the onboard batteries; receiving a trigger pulse by the onboard timing circuit to signal the lamp to go to high output level, onboard timing circuit limiting the time that the lamp remains at high output; signaling the onboard solid state relay to supply high output power to the lamp, the lamp thereby lighting the subject; and returning the lamp to idle after a prescribed lamp flash time.

The step of igniting the lamp includes applying a 25,000 V pulse to the lamp by the combination of the off-board power supply and the onboard ignitor; applying a boost voltage to the lamp, the boost voltage being approximately 300V and being supplied by the off-board controller unit; applying a current pulse to the lamp, the current pulse being from a large capacitance source in the off-board controller unit; and applying a stabilizing current of about 15 A to 50 A to the lamp by the off-board controller unit, the stabilizing current lasting for approximately three seconds.

BEST MODE FOR CARRYING OUT THE INVENTION

Figure 1:
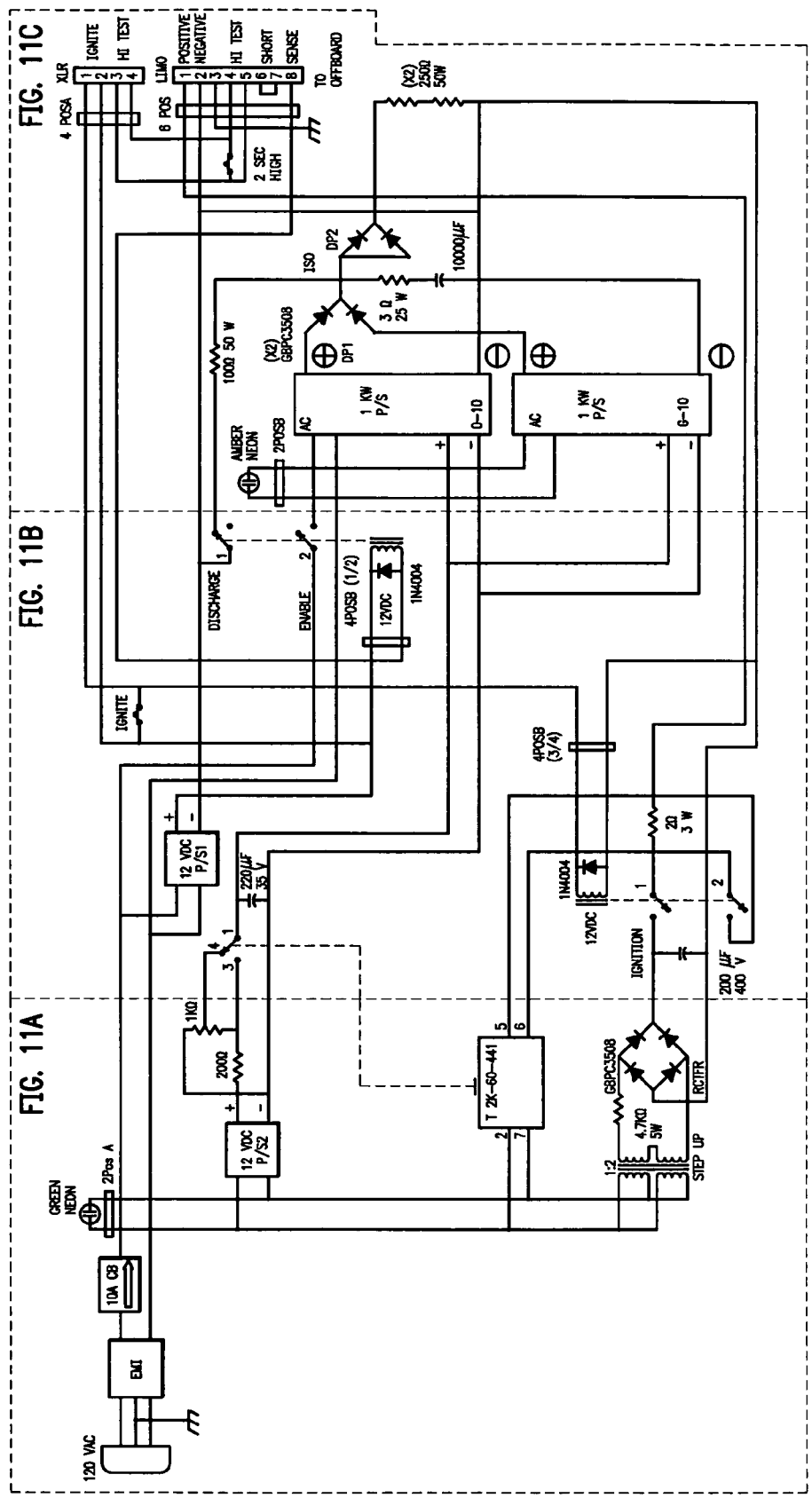
FIG. 1 is an electrical schematic of an off-board controller unit of an embodiment of a Vehicle Safety Testing Lamp Apparatus, System, and Method and also defines the detailed FIGS. 11A through 11C.

The detailed description set forth below in connection with the appended drawings is intended as a description of presently-preferred embodiments of the invention and is not intended to represent the only forms in which the present invention may be constructed or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

The objects given above and the invention described herein is obtained by a system comprised of: (a) an onboard controller unit 100 consisting of onboard batteries or other auxiliary power source, an onboard solid state relay, onboard timing circuit, onboard transfer circuit, onboard current sensor, and current regulator or limiter; (b) an off-board controller unit 200 consisting of an off-board power supply, and an off-board voltage booster circuit; and (c) a lamp fixture 300 comprised of an ignitor, a shock mount 304, and a lamp 306, preferably a long arc xenon lamp.

The ESL (enhanced spectrum long-arc) lamp technology is designed very differently from a commercially available short arc lamp or HID lamps. Several of these differences offer advantages in car safety testing over metal halide or tungsten lamps:

(a) the pressure in the lamp is negative which prevents an explosion when failure occurs;
(b) the arc length is relatively long which reduces glare and shadows that are produced by point source-like lamps;
(c) the total amount of infra-red (heat) to visible light is far less than tungsten lamps which reduces heat load in the cabin; and
(d) far less energy is used to achieve the high output level due to a combination of efficiency and fast transition to high intensity levels relative to metal halide technology.

Furthermore, the lamps are enhanced by having about double the thickness of the usual quartz wall so that they are more resistant to breaking during impact of the test vehicle. Also, the lamps are shortened at the seals and end caps in a fashion that the seals can still withstand high amperage loads while being extremely short.

The ignition of an ESL lamp generally requires a special power supply. Ignition is comprised of several physical processes: breakdown, boost, current pulse, and arc stabilization. Like many gas discharge or arc lamps, a very high voltage must be initially supplied to achieve breakdown of the gas and start the flow of current. In the current invention, 25,000 V is supplied to the lamp by the combination of the off-board power supply and the onboard ignitor.

The separation of the supply and boost circuit from the ignitor reduces the weight of components required to be onboard, since the power supply, a large storage capacitor, and the boost circuit can be located off-board. In an embodiment of the invention, the boost circuit weight is about 9.8 kg (22 lbs), while the ignitor portion of the supply weighs about 0.4 kg (0.9 lbs). For the 1600 W mini high-G lamp system described herein, the onboard unit weighs about 11 kg (25 lbs) and the lamp fixture weighs about 1.6 kg (3.5 lbs). The ignitor supplies the breakdown voltage, and otherwise passes the current and voltages supplied by the off-board controller unit 200 elements.

While there is a slight gain in the weight of the ignitor added to the onboard components, locating the ignitor nearer the lamp 306 is advantageous for reducing the length of cable that must carry the high voltage ignition pulse. The cable may act as an antenna for electromagnetic noise produced by the 25,000V ignition pulse, and this noise can be damaging to equipment onboard. By locating the ignitor close to the lamp 306, and by enclosing the ignitor in a Faraday cage, this noise is greatly attenuated.

The current supplied during this 25,000 volt pulse is minimal, and the pulse lasts for milliseconds or less. Once the gas is broken down, a current can be made to flow. Initially, to get the current flowing after breakdown a boost voltage is generally required. This boost voltage is supplied by the off-board controller unit 200, typically via the off-board voltage booster circuit, and is approximately 300V. This boost voltage breaks down immediately as current begins to flow through the arc and again lasts for micro-seconds or less. A current pulse from a large source of capacitance is then applied to the lamp 306 from the off-board controller unit 200. The pulse lasts less than a millisecond. Finally, to stabilize the arc on the anode and cathode, a current of about 36 A is supplied by the off-board controller unit 200 that lasts for approximately three seconds. By locating the majority of the components required for ignition in the off-board controller unit 200, the lumens-to-kilogram ratio is greatly enhanced.

After the lamp 306 is ignited, the off-board controller unit 200 supplies power to the lamp 306 at its low (idle) output level. The lamp 306 can idle indefinitely at its low output level. During this time, the setup and preparation of the cameras and other onboard equipment for car safety testing can proceed. By providing off-board power during this phase of car safety testing, the onboard batteries are not being used and remain available for the critical last phase of the testing. This separation of off-board power supply and onboard batteries in the non-critical phase also serves to reduce the capacity of batteries required onboard and hence reduces the weight of onboard components further. This also contributes to increasing the lumens-to-kilogram ratio.

When the car is finally ready for testing, it will be moved by external means to crash into a barrier or to roll over. Conversely, an external mass can be moved into the car. This begins the critical last phase of car safety testing. At this point, the off-board components are generally disconnected and the onboard components run under battery power. To accomplish this, the invention uses an onboard transfer circuit. The onboard transfer circuit allows the off-board power supply to be disconnected while the onboard controller unit 100 maintains the lamp 306 in an idle.

The onboard batteries or other auxiliary power source then take over power. The onboard timing circuit awaits a trigger pulse supplied by the car safety test facility to signal the lamp 306 to go to high output level. It is desirable that the lamp 306 go to high output level when the car is experiencing deceleration and the cameras are recording. The onboard timing circuit also limits the time that the lamp 306 can remain at high output. Limiting the high output level time helps to prevent the lamps from failing, due to overheating, during the test period. Once the trigger pulse is received, the onboard timing circuit signals the onboard solid state relay to supply high output power to the lamp 306. Solid state relays are preferred over electromechanical relays due to their resistance to high deceleration forces.

During the idle period, the current from the onboard batteries flows to an onboard current regulator. As used in this disclosure, the current regulator may be a current limiter, although a current regulator is preferred. The current regulator reduces the current flow to the lamp 306 to that required for idling. During the high output level of the lamp 306, current flows directly from the onboard batteries to the lamp 306. During the high output level, the battery voltage and the lamp internal resistance determine the current that flows through the lamp 306 and the output power. For a tested embodiment of the invention using a 1600 W lamp, the onboard battery capacity was about 8400 milliamp-hours. The onboard solid state relay is used to change the current path from the low output level to the high output level. Because there is no need for a high current onboard supply, the weight of onboard components is greatly reduced. This further increases the lumens-to-kilogram ratio.

Once a trigger pulse is supplied and the prescribed lamp flash, or burn, time has been completed, the lamp 306 will either extinguish or return to idle. At this point, the test is completed. To repeat the test, the onboard batteries generally must be recharged.

In an alternate mode, the trigger pulse is in sync with the shutter out signal of one or more high speed cameras, and the duration of the lamp flash, or burn, is approximately equal to or less than the shutter opening time. In this pulsed mode, the duty cycle of the lamp is lower and therefore the power output can be elevated. This mode further enhances the lumens-to-kilogram ratio and thereby also reduces background levels in the resulting images.

Figure 9:
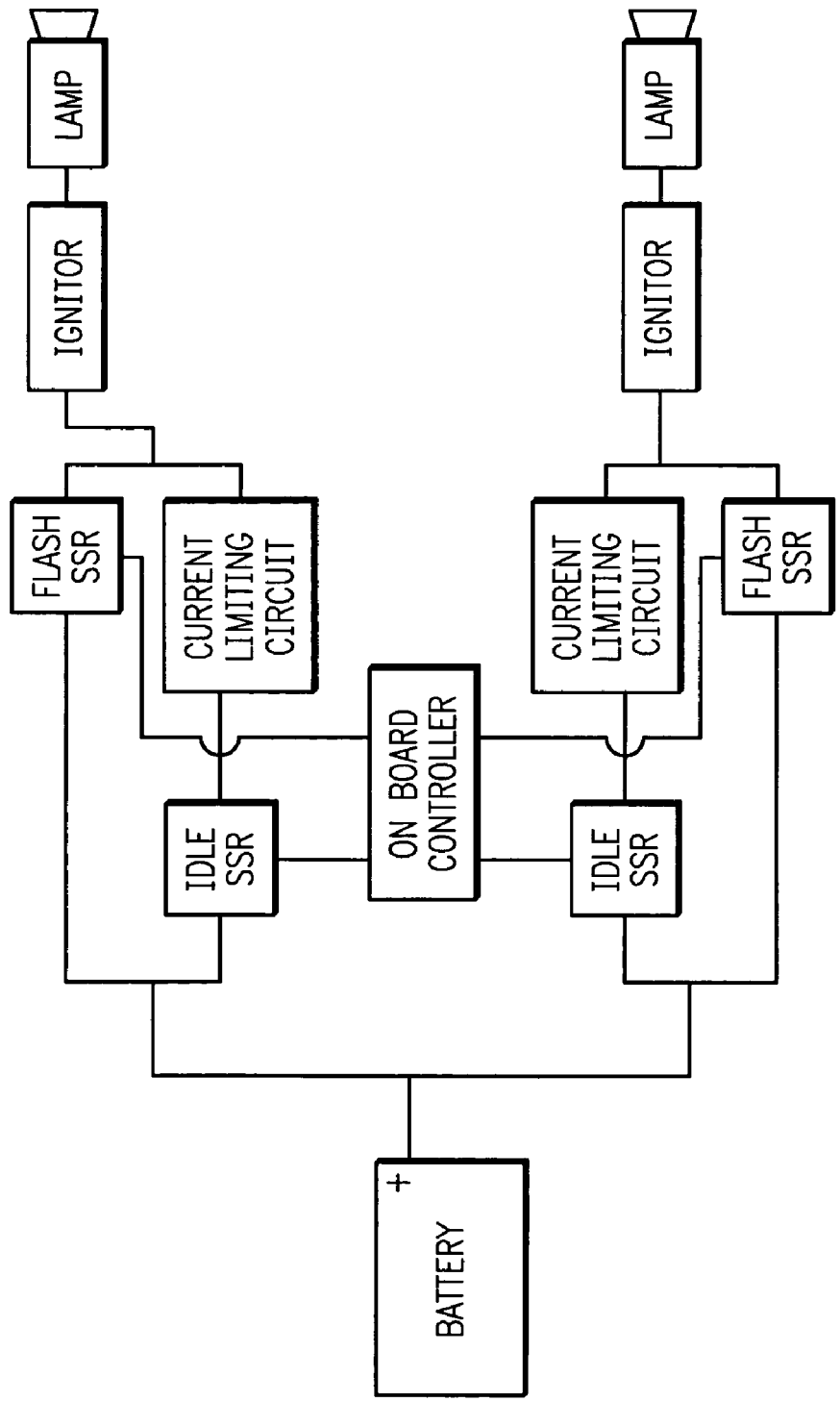
FIG. 9 is a block diagram depicting an embodiment of the invention combining multiple lamps with one battery.

In a version of the invention, two or more lamps 306 may be combined with one battery as, for example, shown in FIG. 9. This embodiment is useful for improving the power to weight ratio where multiple lamps are used. Whereas a single battery may have slightly more capacity than is necessary for a single lamp, by spreading the battery capacity over a plurality of lamps the overall battery capacity/weight ratio is optimized.

One further option is to use an ultra-capacitor in place of one or more onboard batteries. For high current applications such as the invention disclosed herein, ultra-capacitors have greater energy density to weight ratio than some battery technologies.

In another alternate mode, the trigger pulse is supplied by an accelerometer within the onboard controller unit 100, rather than by the car safety test facility. When the car begins to decelerate, the accelerometer signals an internal trigger pulse.

In another alternate mode, the onboard transfer circuit is activated by a breakaway cable.

In an alternate mode, the batteries, energy storage device, or other auxiliary power supply may be off-board and connected to the lamp fixture by a flexible, tethered electrical cable. This has the advantage of dramatically increasing the lumens to kilogram ratio inside the vehicle, but has the disadvantage of limiting the types of crash tests that can be performed.

Figure 2:
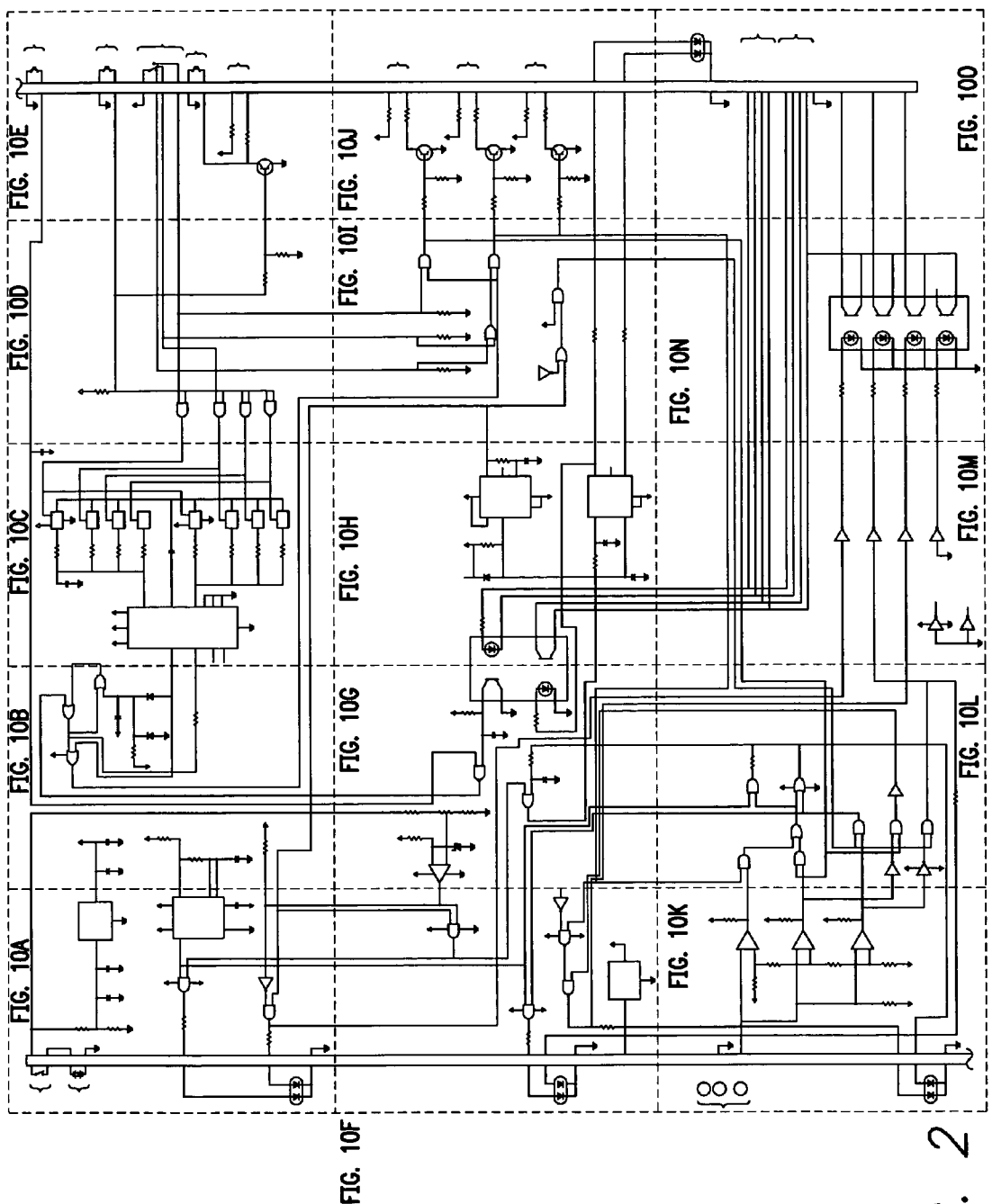
FIG. 2 is an electrical schematic of an onboard controller unit of an embodiment of the invention and also defines the detailed FIGS. 10A through 10O.
Figure 10A:
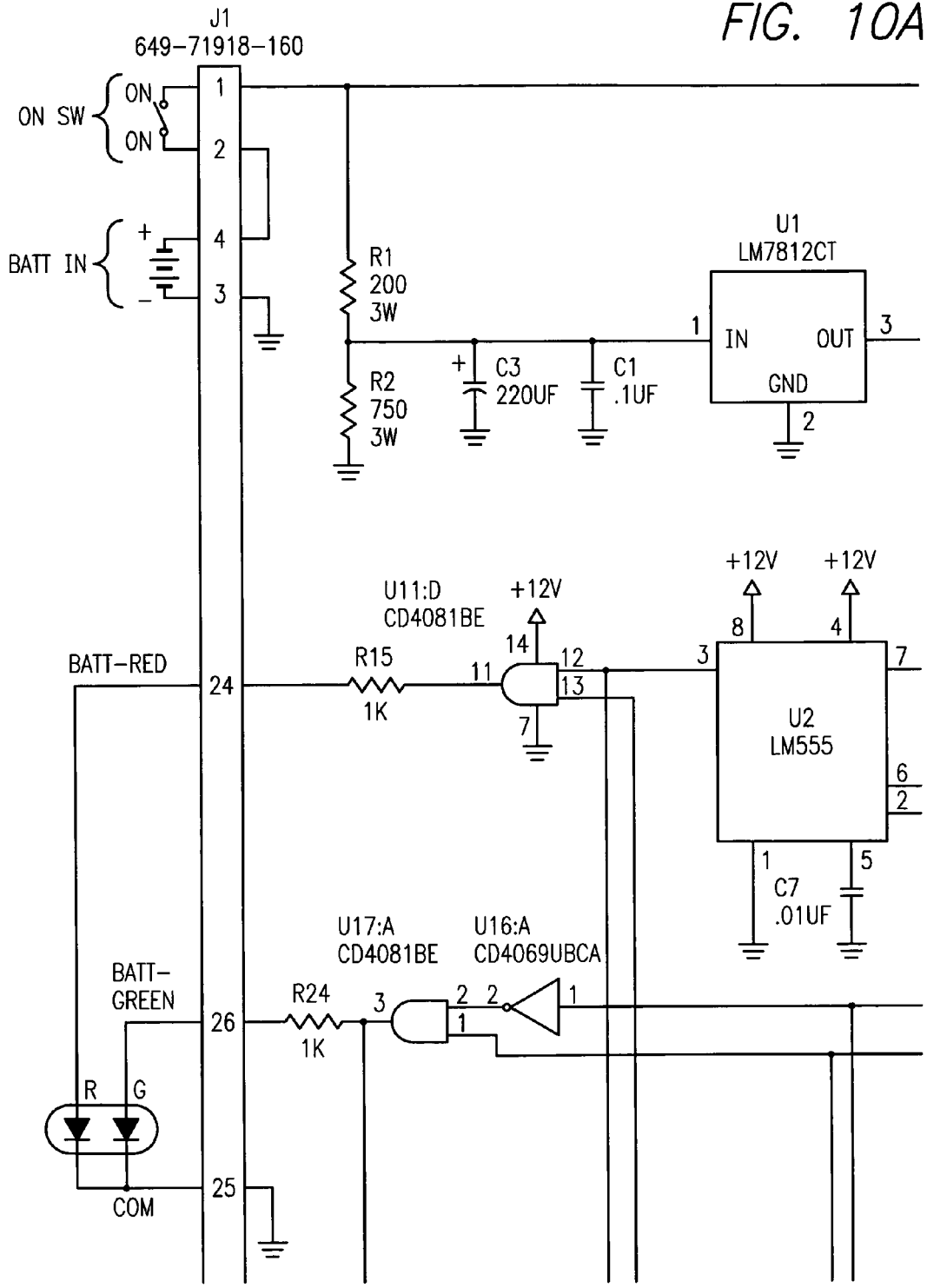
FIGS. 10A through 10O are detail views of the circuits shown in FIG. 2.
Figure 10B:
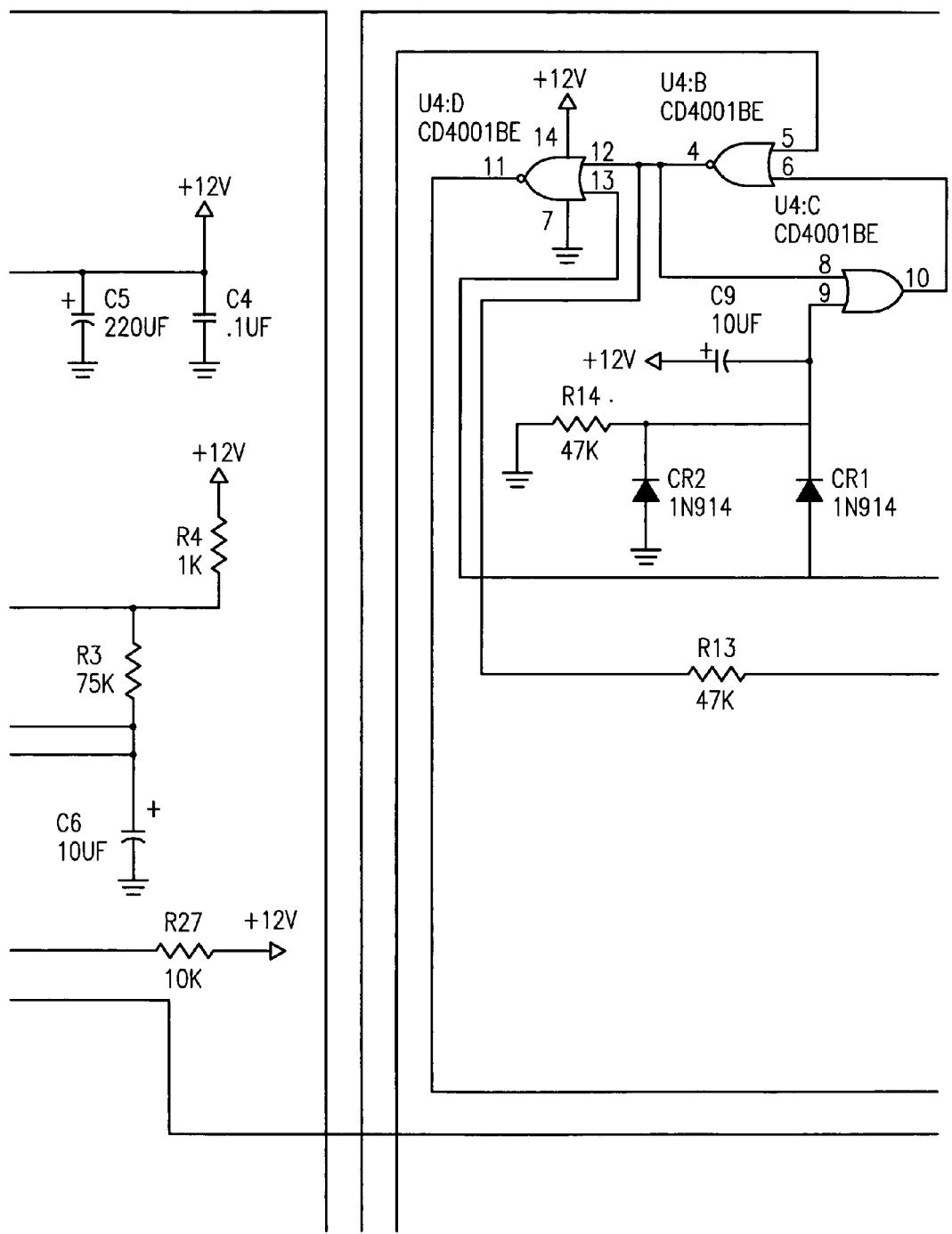
Figure 10C:
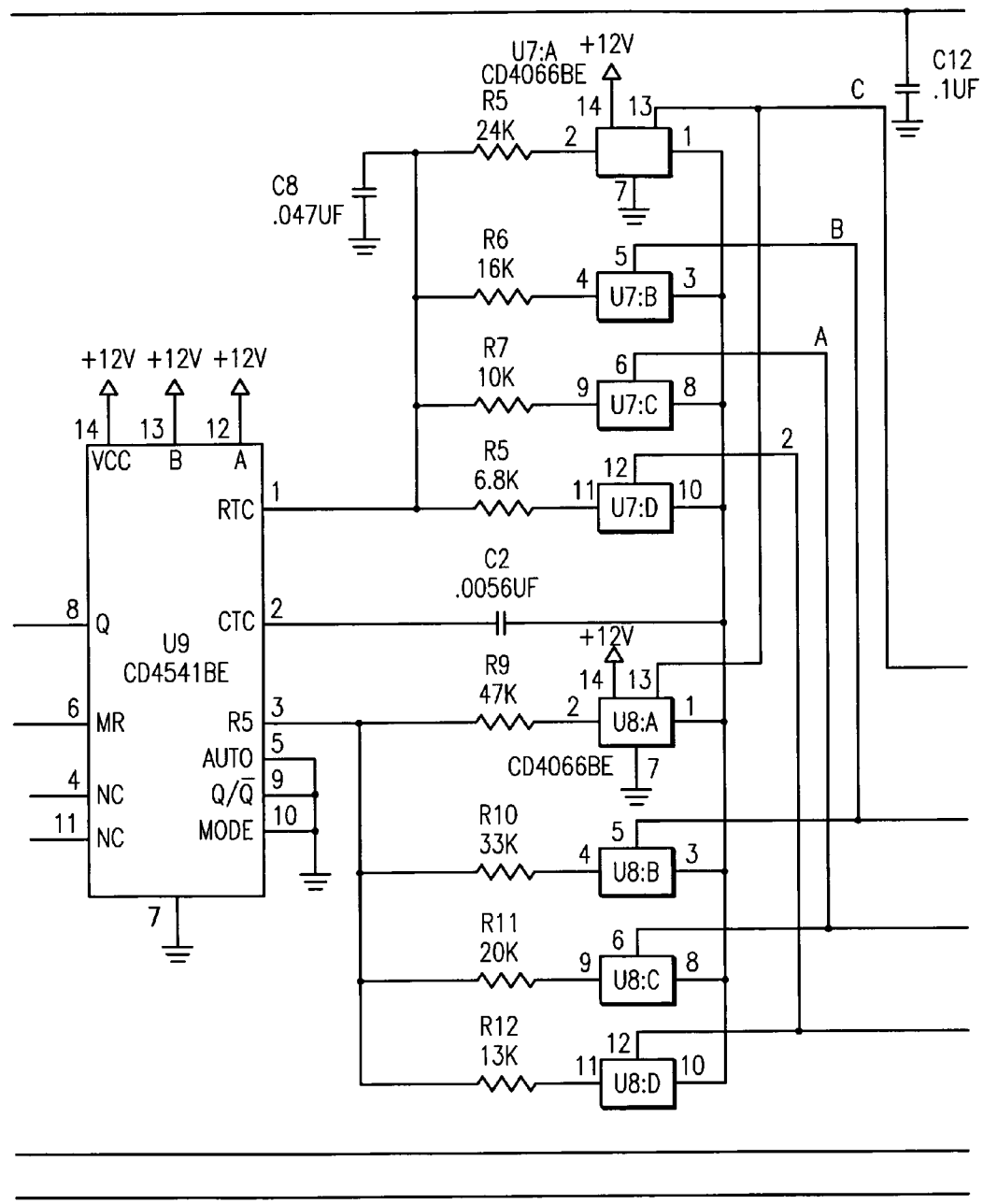
Figure 10D:
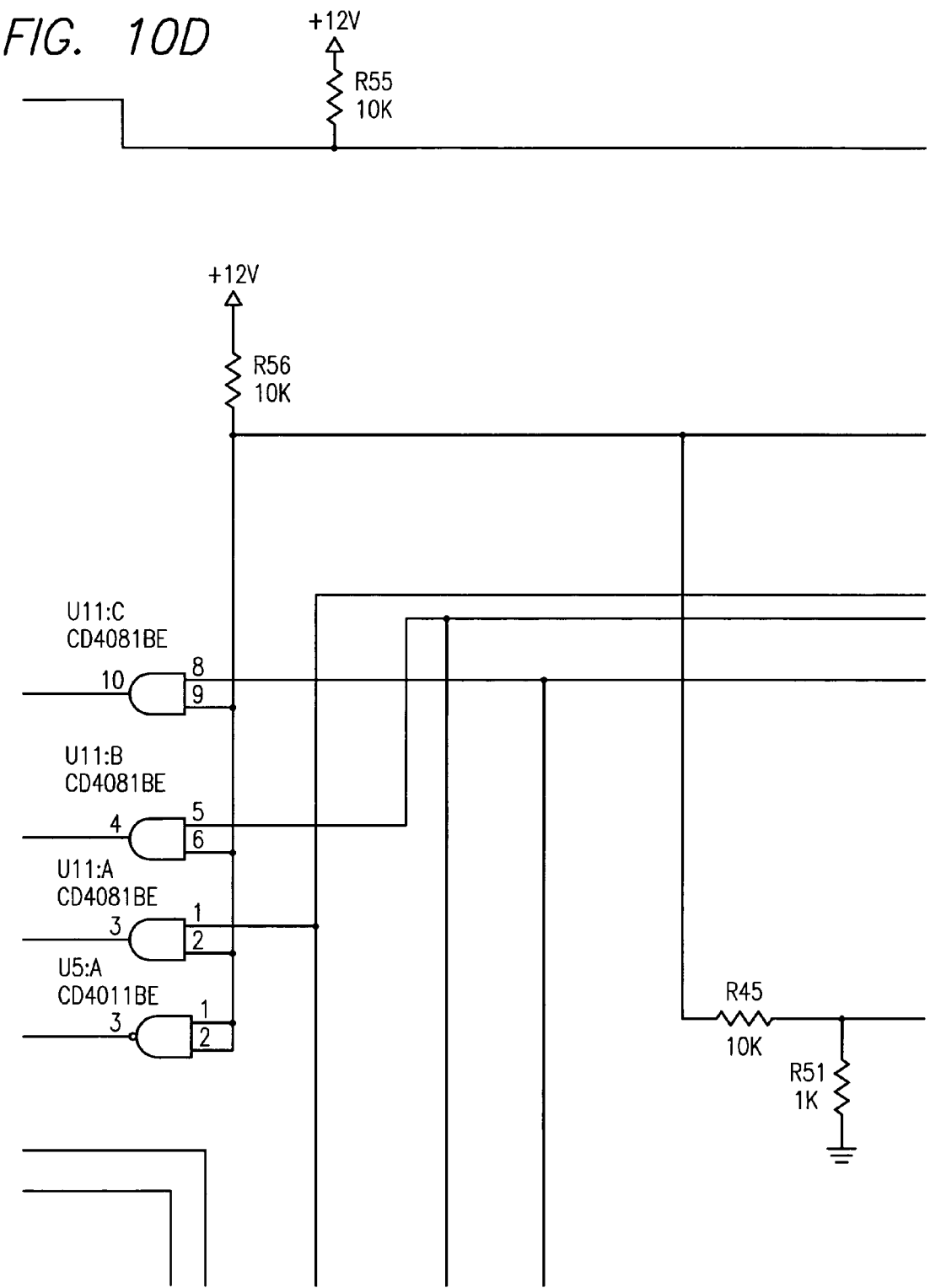
Figure 10E:
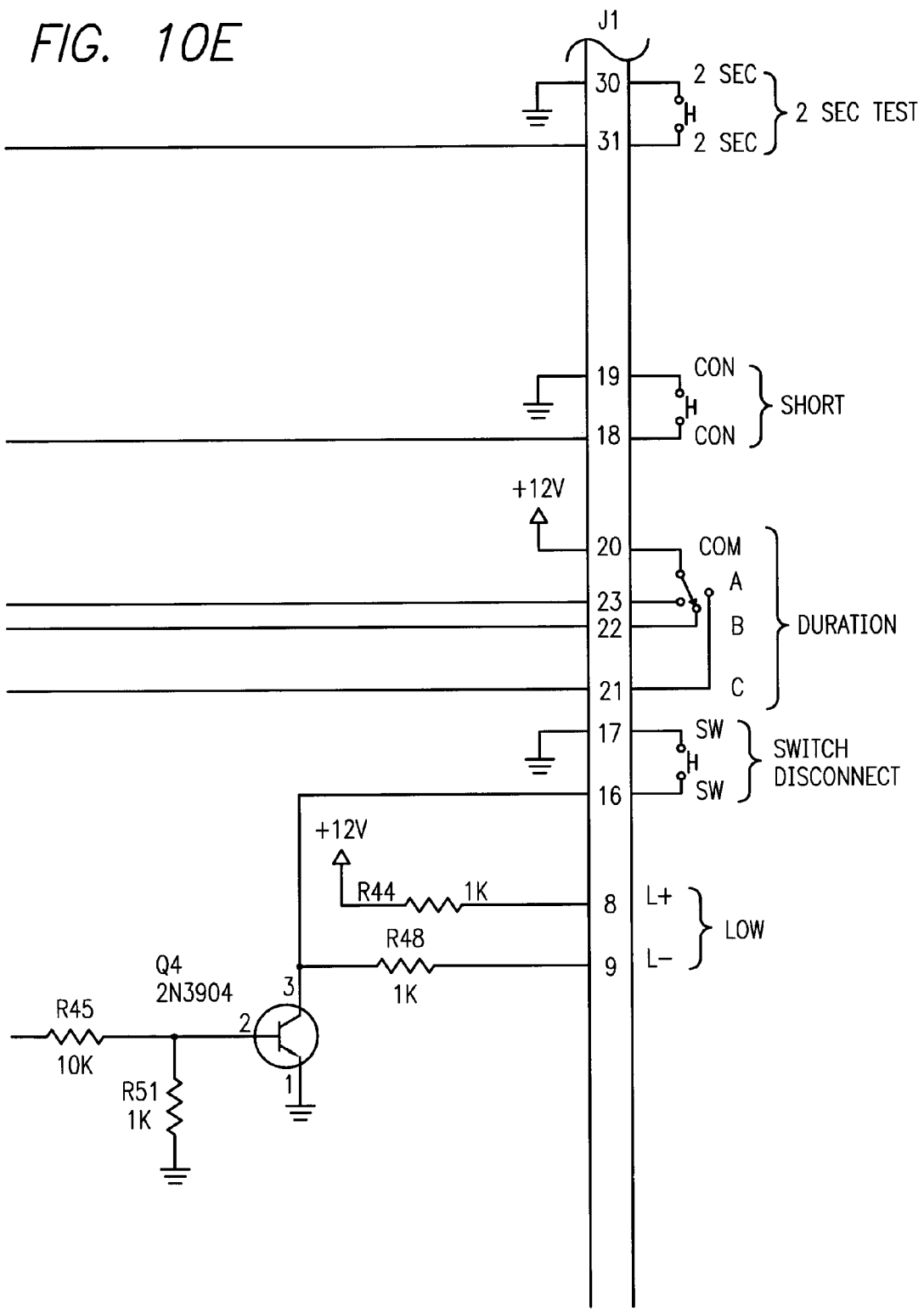
Figure 10F:
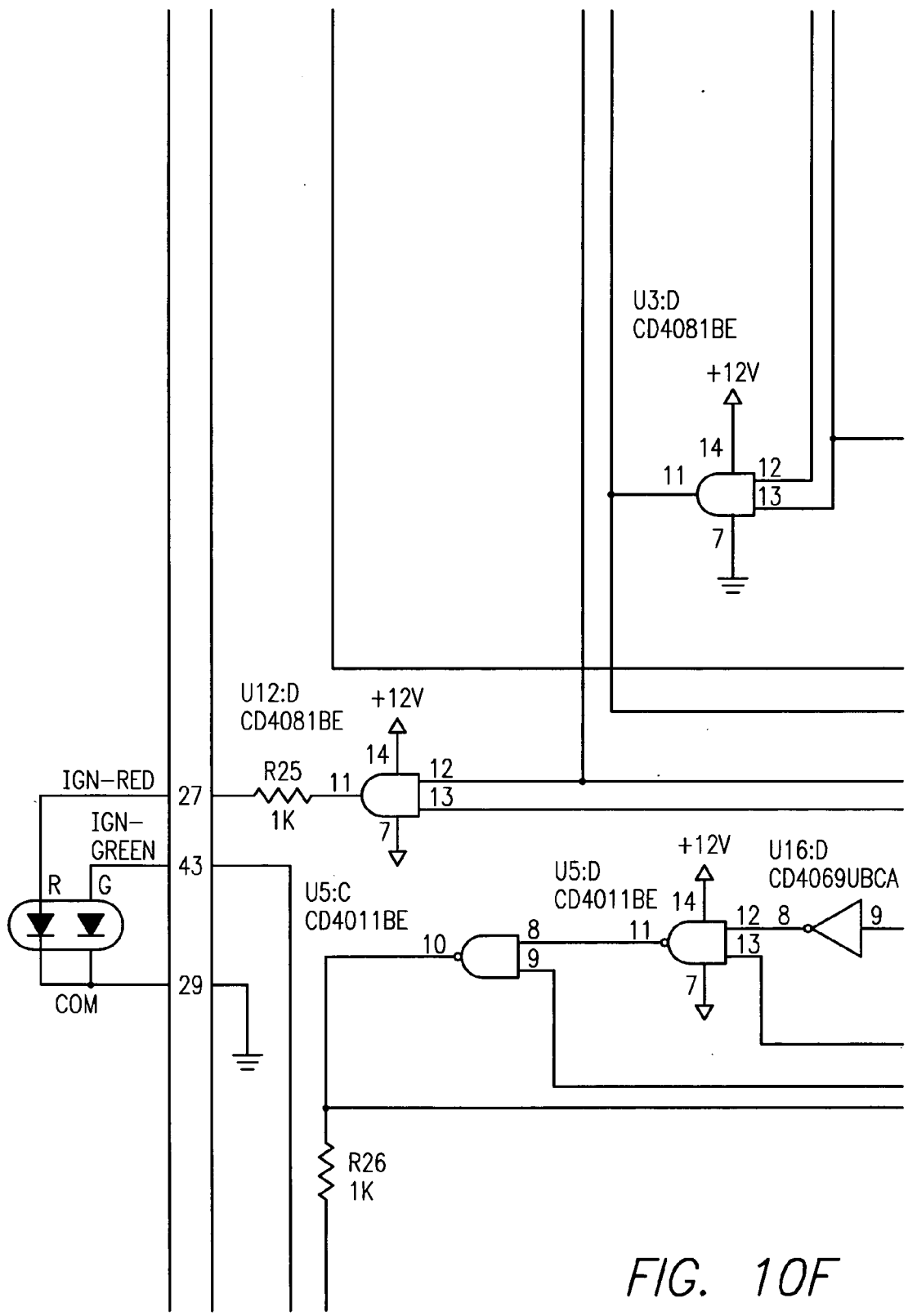
Figure 10G:
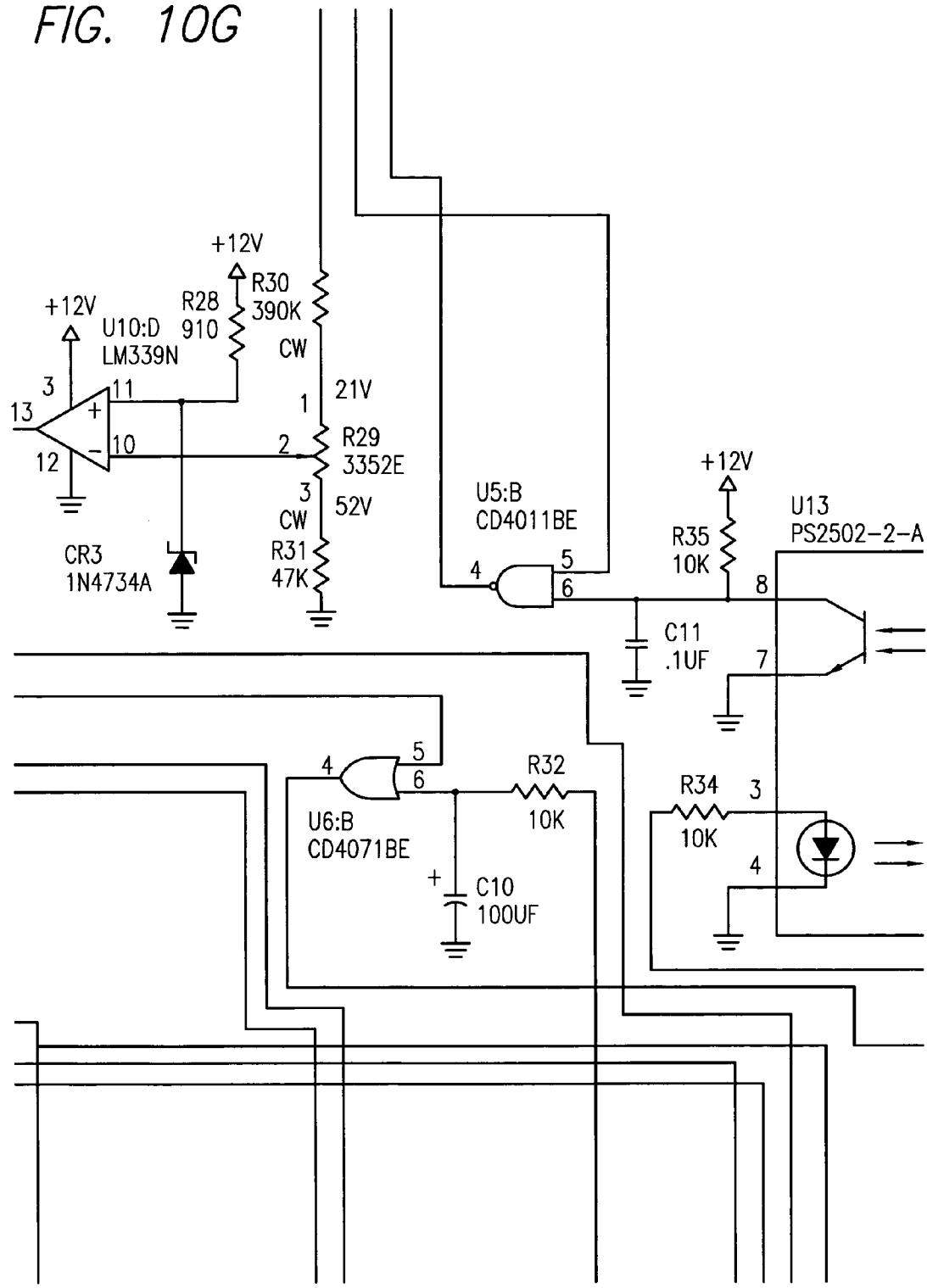
Figure 10H:
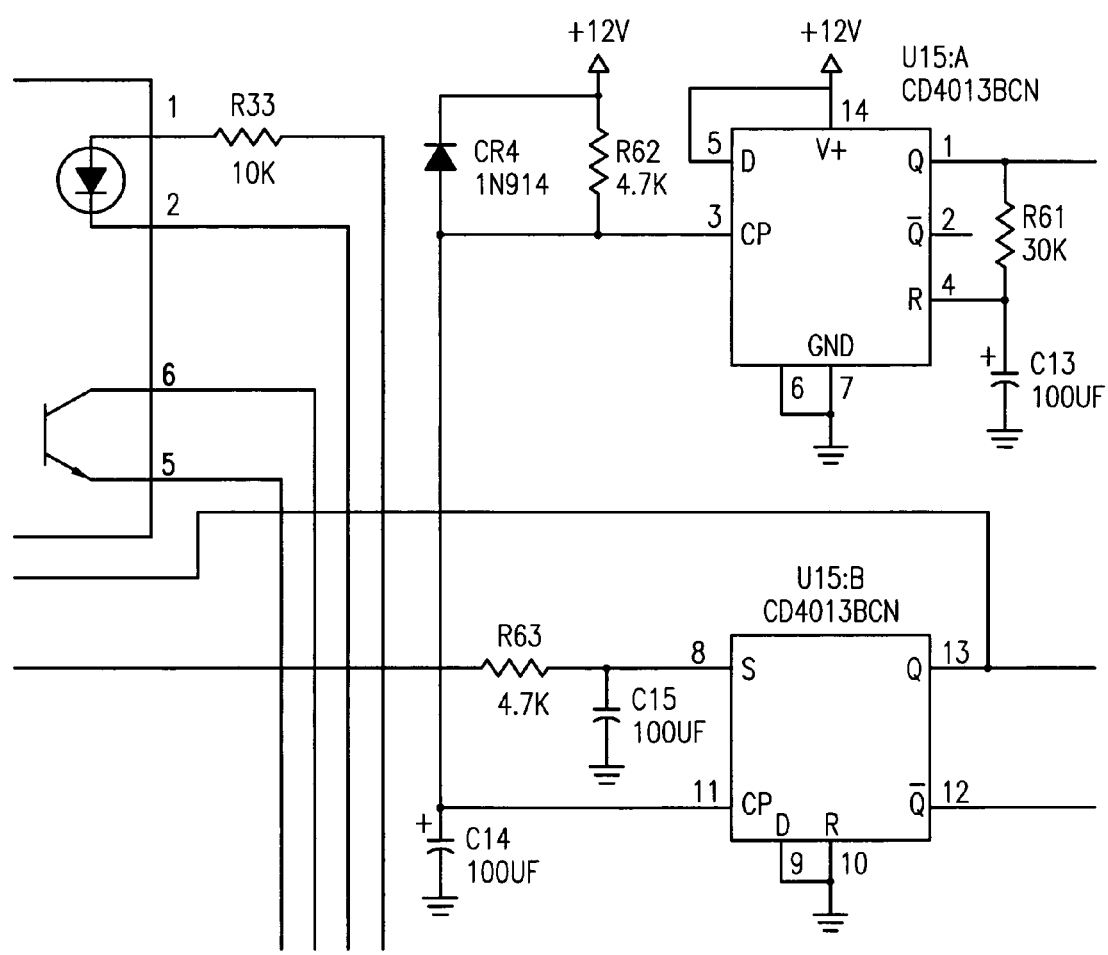
Figure 101:
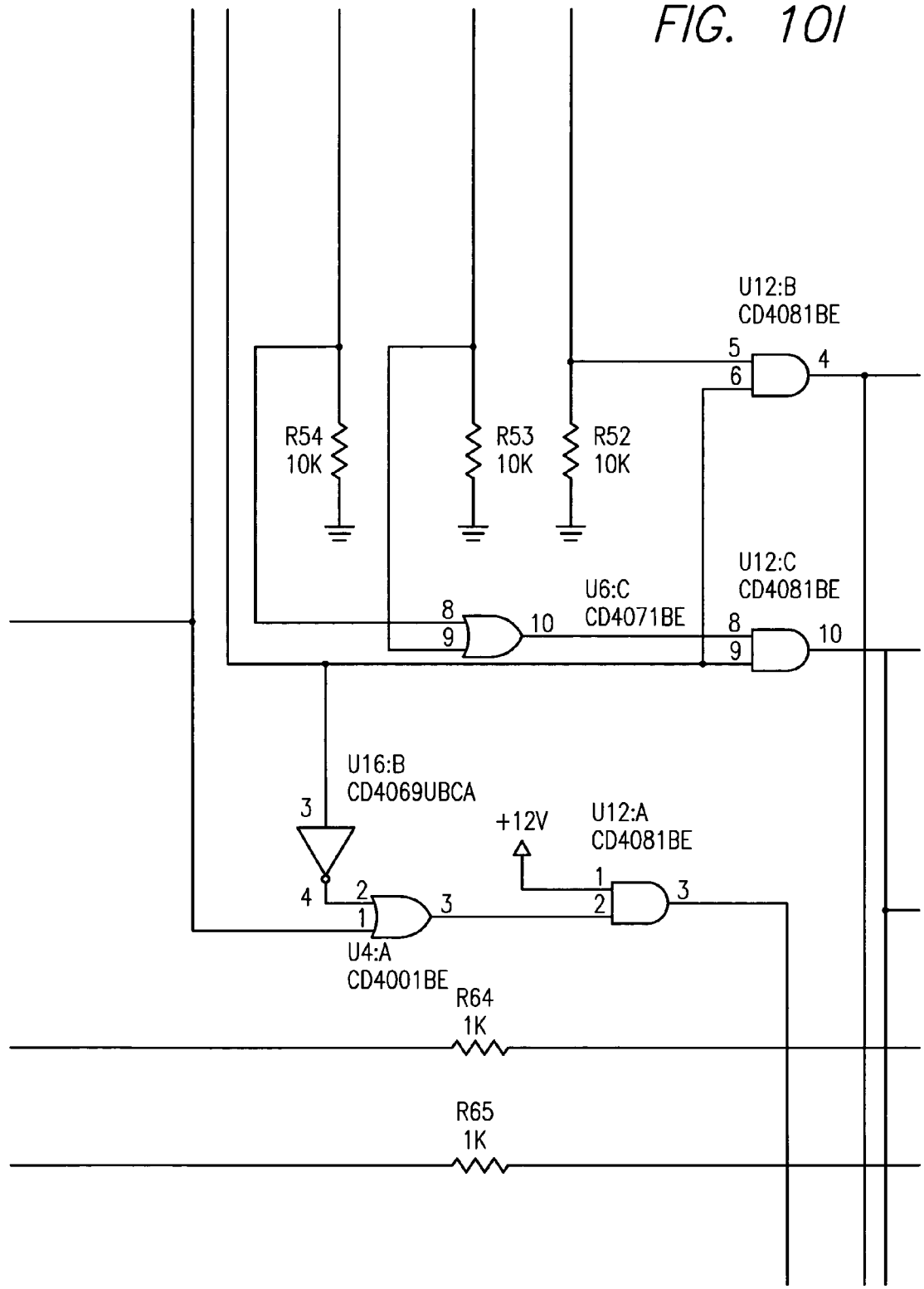
Figure 10J:
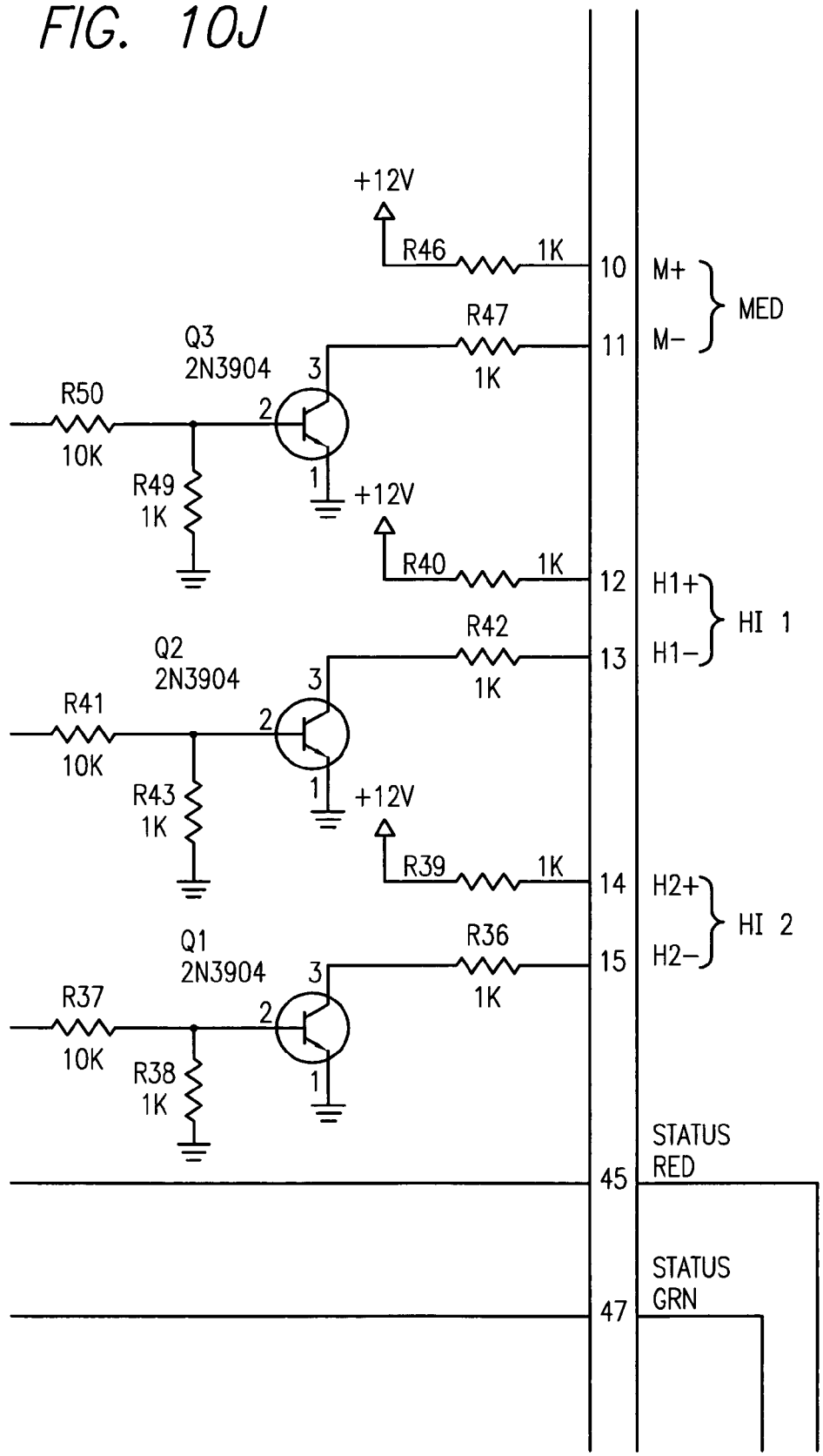
Figure 10K:
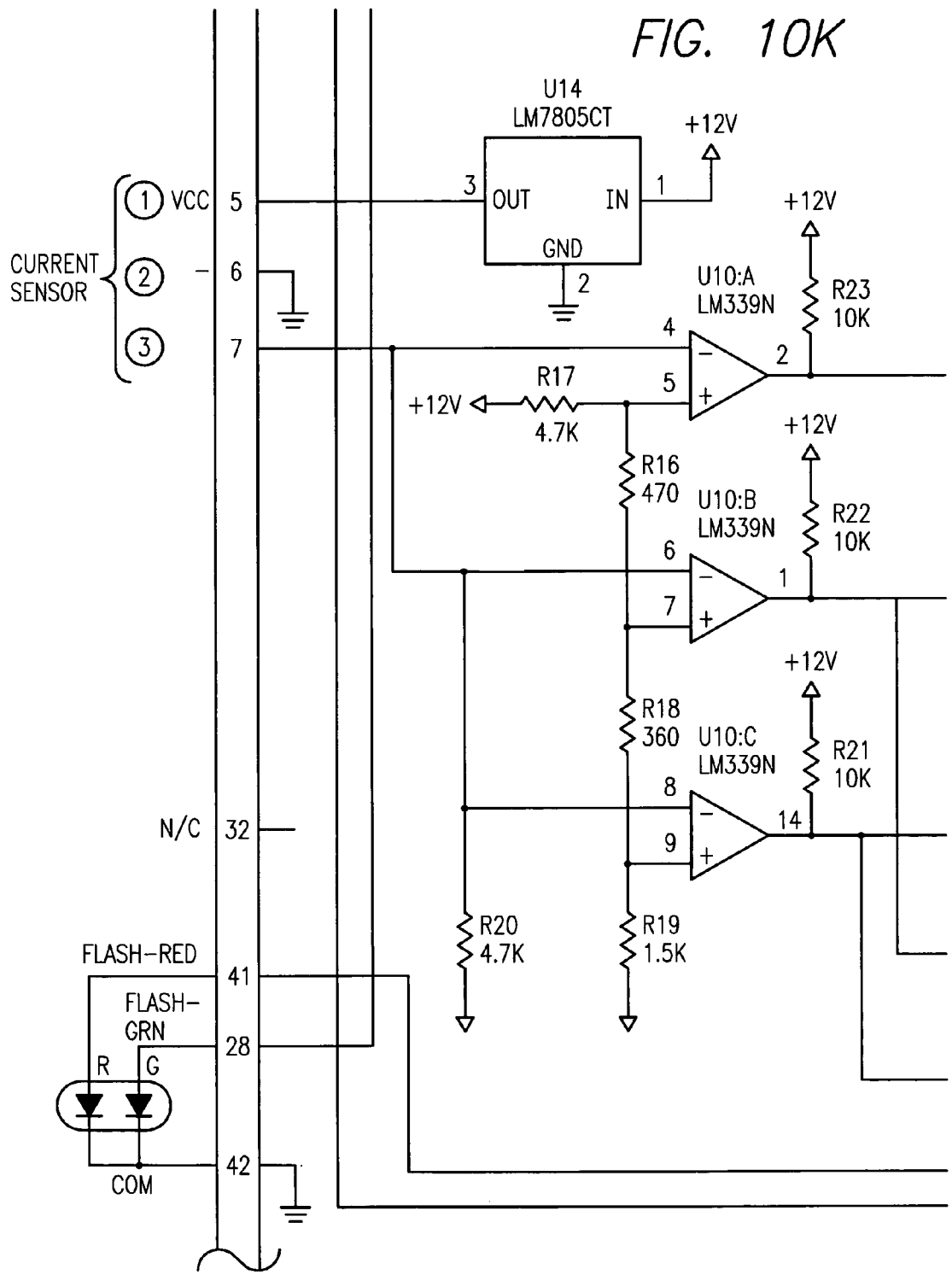
Figure 10L:
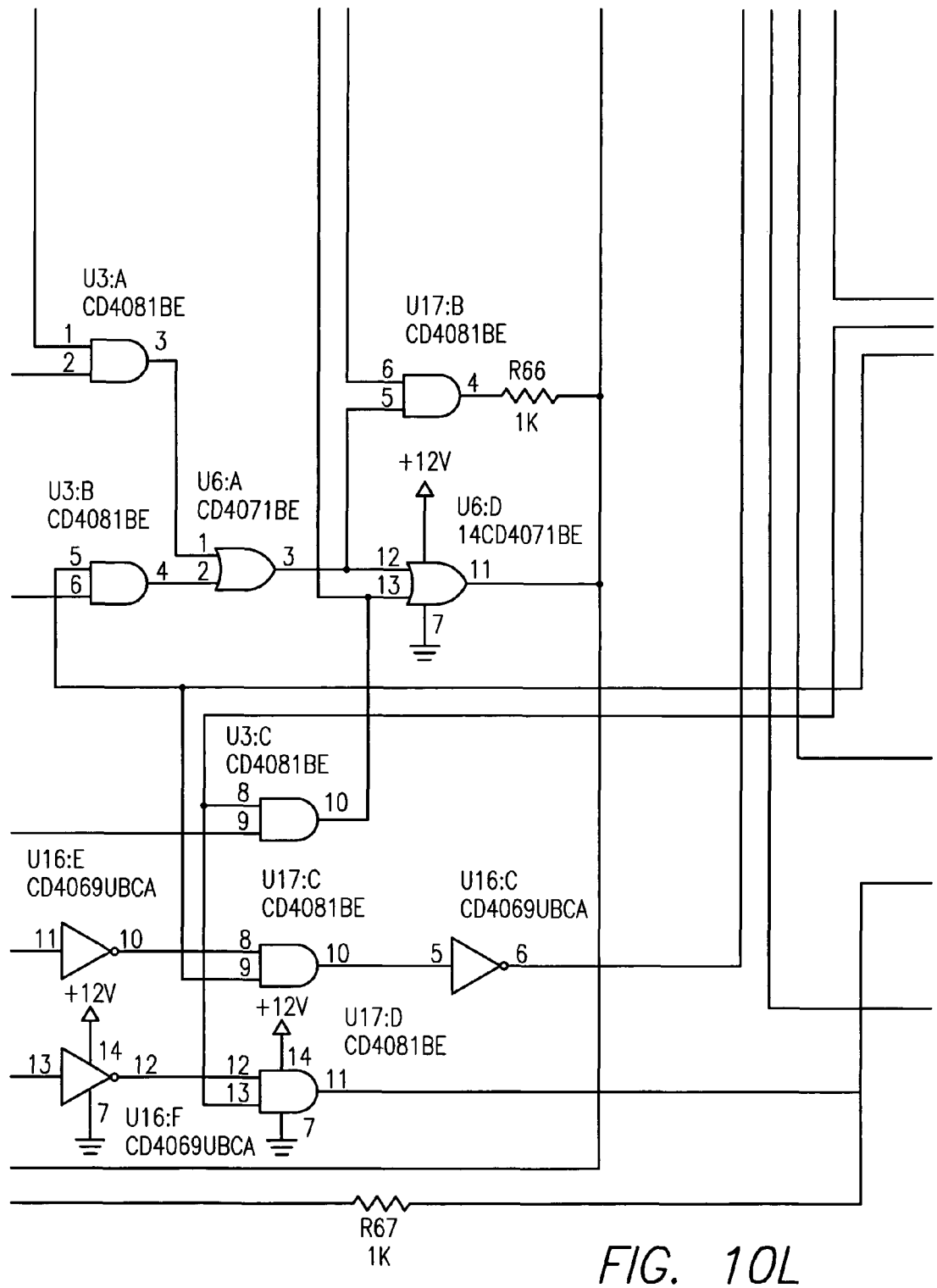
Figure 10N:
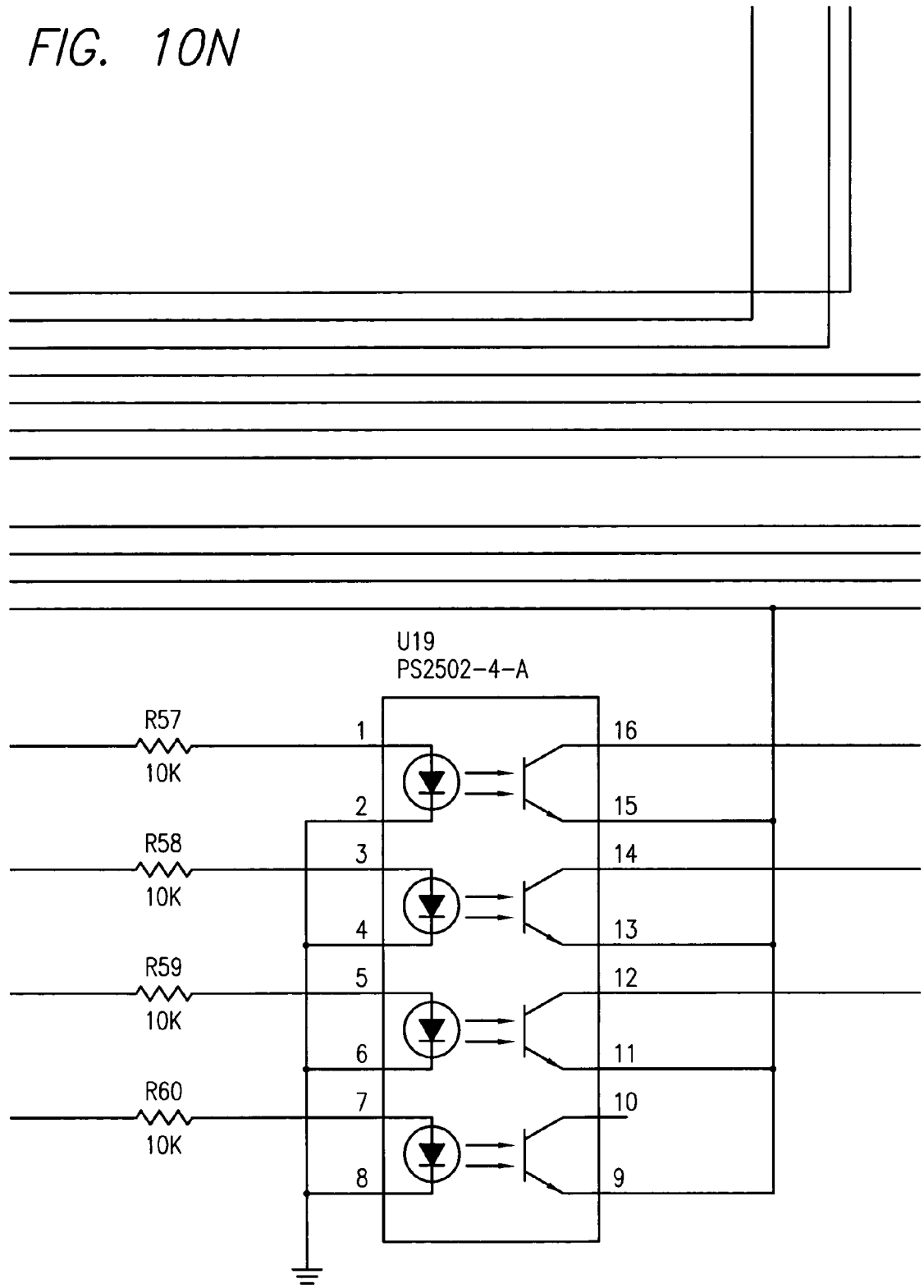
Figure 100:
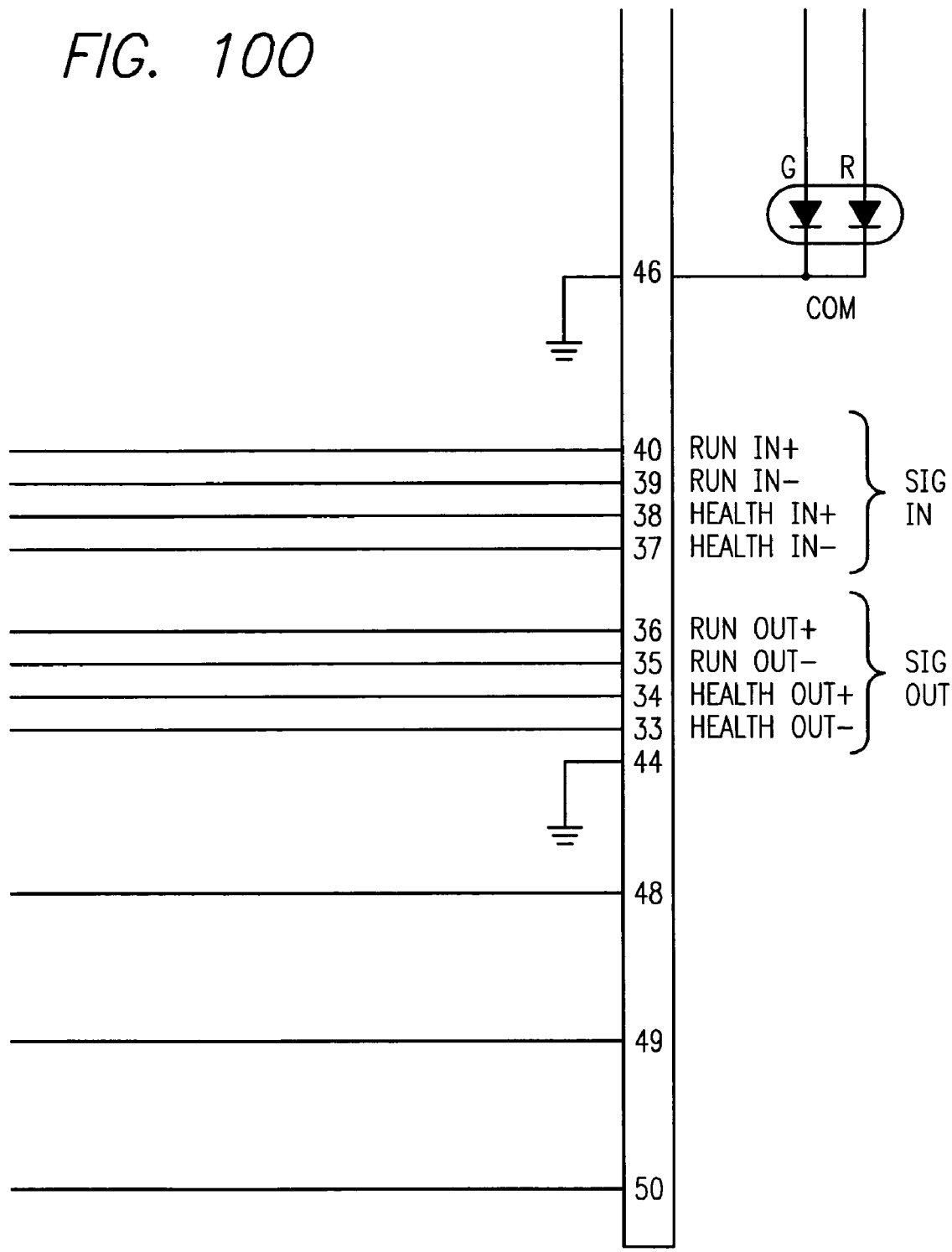
Figure 11A:
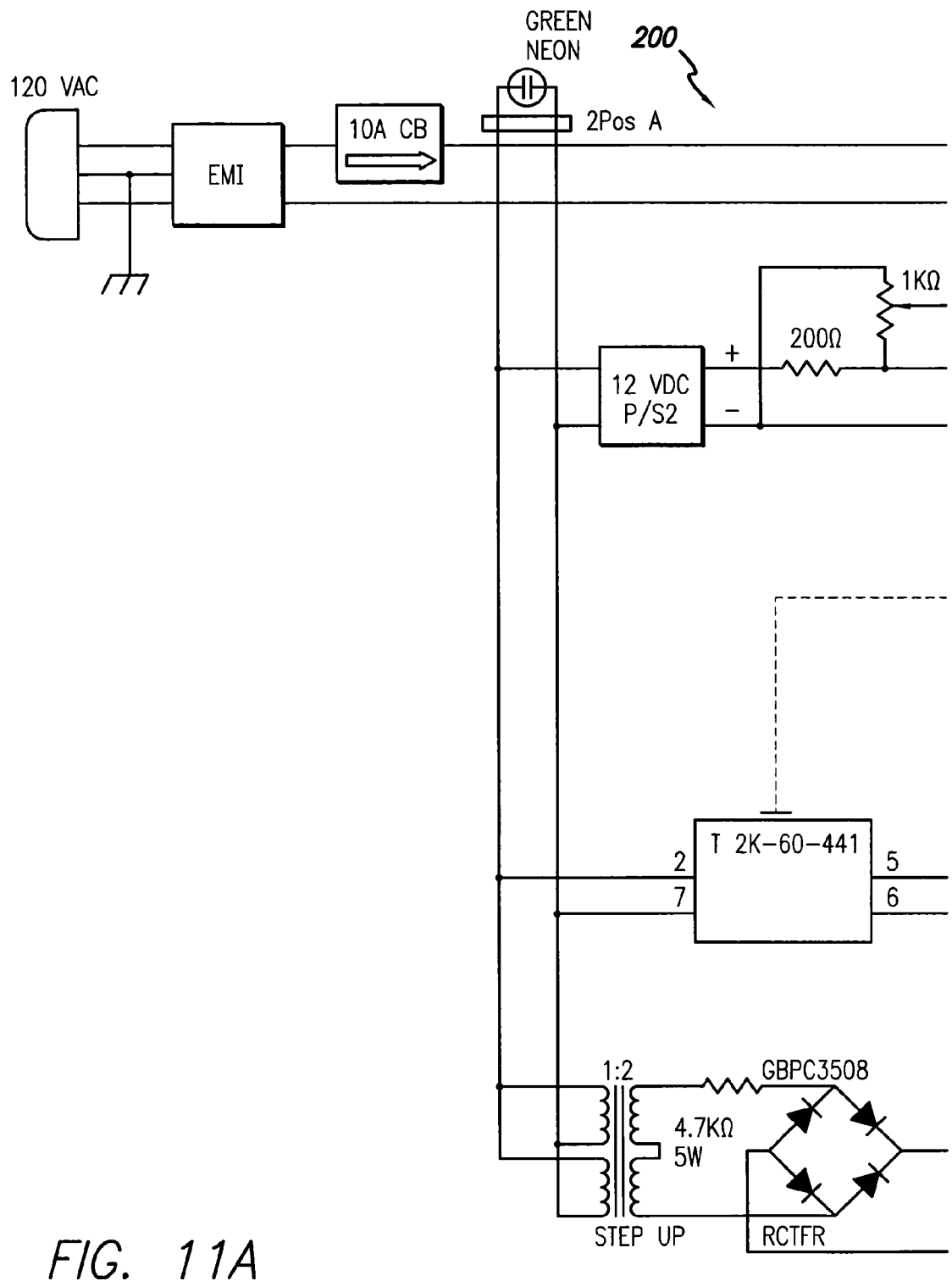
FIGS. 11A through 11C are detail views of the circuits shown in FIG. 1.
Figure 11B:
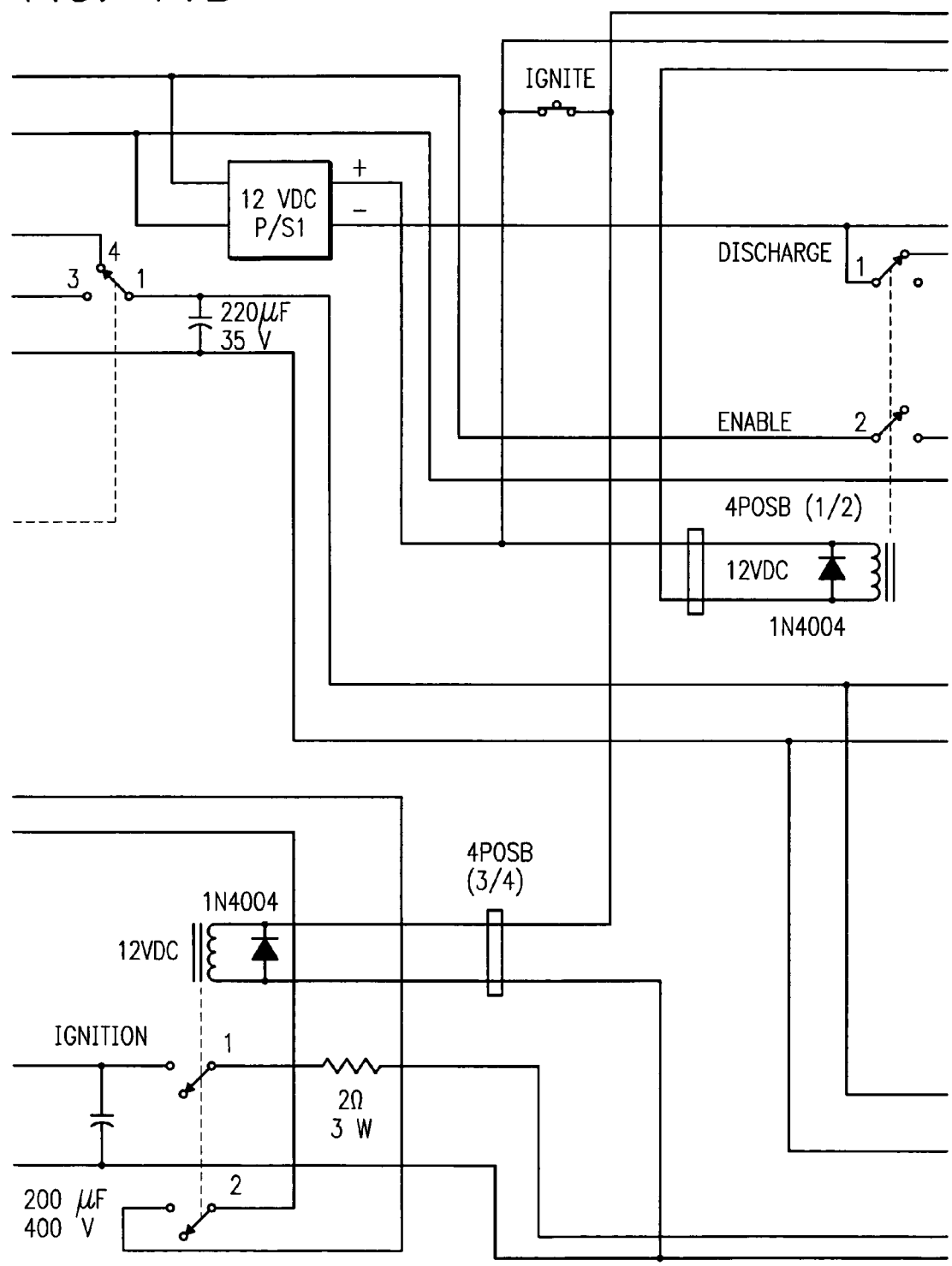
Figure 11C:
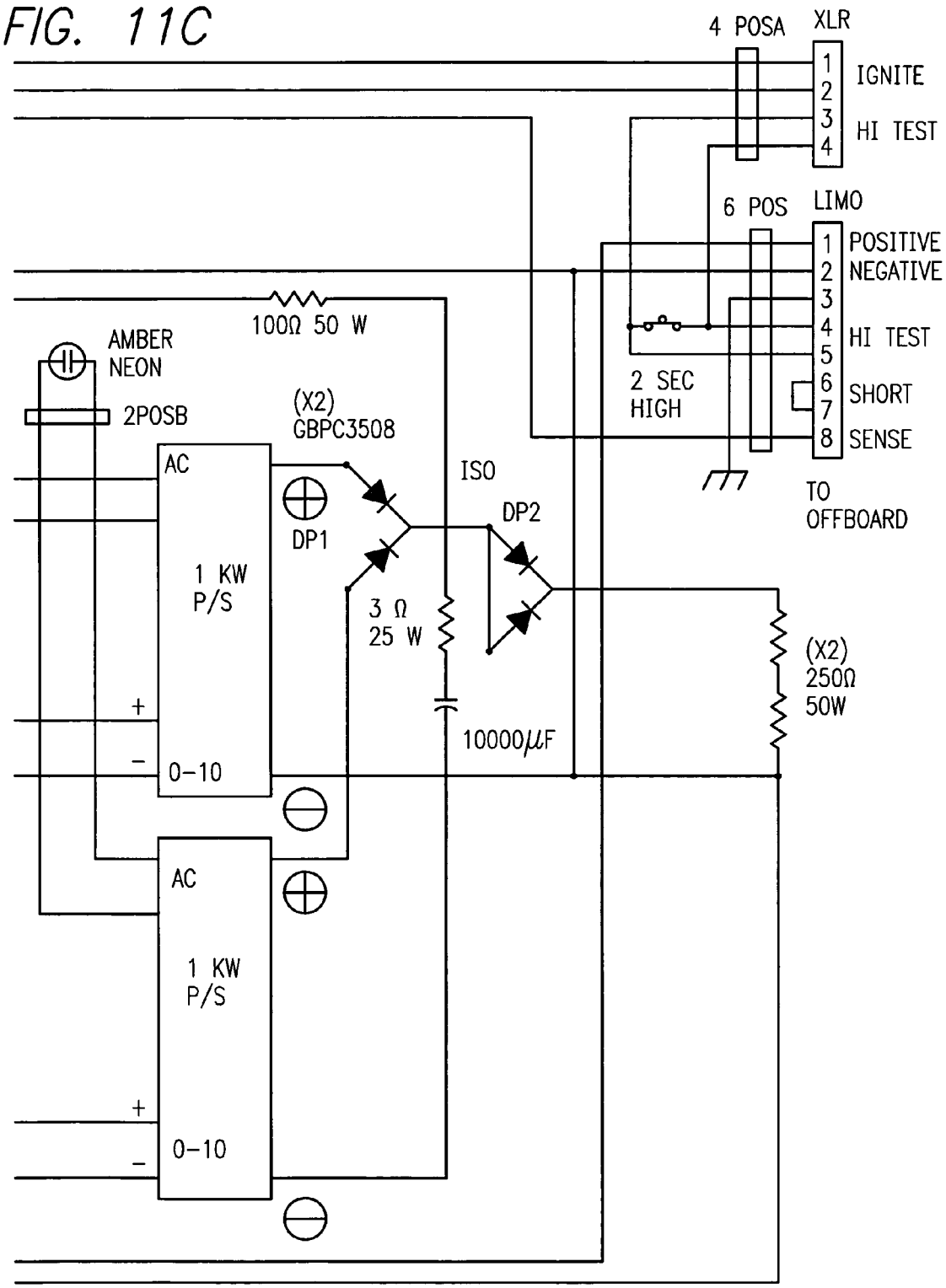

An electrical schematic of a version of the off-board controller unit 200 is shown in FIG. 1 and, in greater detail, in FIG. 11A through FIG. 11C. Two constant current supplies are used to supply power to the lamp 306. The supplies run on AC line voltage of 120V and each is capable of outputting 18 A at 40V DC. The two supplies are wired in parallel so as to supply a combined current of 36 A. The outputs of the supplies are diode protected and the combined output of the two supplies is also diode protected. The current output of the supplies is capable of being controlled by a 0-10V control voltage with 0V being equivalent to a low current and 10V being equivalent to a high current. The control voltage is supplied by a 12V AC-DC power supply through a voltage divider. A one kilo-ohm potentiometer connected to the voltage divider is used to set the value of the idle voltage. A timing relay switches the potentiometer wiper off and on. The timer relay is controlled by an ignition switch (momentary). There is a large 10,000 micro-Farad capacitor connected to the output of the constant current power supplies. The capacitor is charged through a 3 ohm resistor and discharged through the 3 ohm resistor in series with a 100 ohm resistor. The charge discharge state of the capacitor is controlled by a relay. The charge/discharge relay also turns AC power on/off to the constant current power supplies. The relay is powered by a 12V AC-DC power supply and the input to the relay is diode protected. The off-board voltage booster circuit is composed of a transformer and four diodes. The off-board voltage booster circuit is also controlled by the ignition switch through a relay. The output connecter of the off-board has the following pin out:

1. Positive of the constant current supply
2. Return of the constant current supply
3. Chassis ground
4. A first pole of the 2 sec Hi Test switch
5. A second pole of the 2 sec Hi Test switch
6. A short to pin 7 (used to signal the onboard unit that the off-board is connected/not connected)
7. A short to pin 6
8. Negative 12V A version of the onboard system schematic is shown in FIG. 2, and detail views of the circuits of FIG. 2 are shown in FIGS. 10A through 10O. The onboard controller unit 100 contains the onboard timing circuit, the onboard transfer circuit, the onboard current sensor, and the onboard current-correct circuit. Connected to the onboard controller unit 100 is the onboard solid state relay, the onboard current sensor, on/off switch, and time switch. The onboard controller unit 100 is also connected to panel mount connectors on the front panel of the onboard unit: the lamp cable connector, the off-board cable connector, and the data acquisition system (D.A.S.) cable connector. Two battery packs, whose outputs are wired in parallel, are connected to the onboard solid state relay through protection diodes. Two LED's are also connected to the onboard controller unit 100, one for indicating battery condition and one for indicating system health status.

Figure 3:
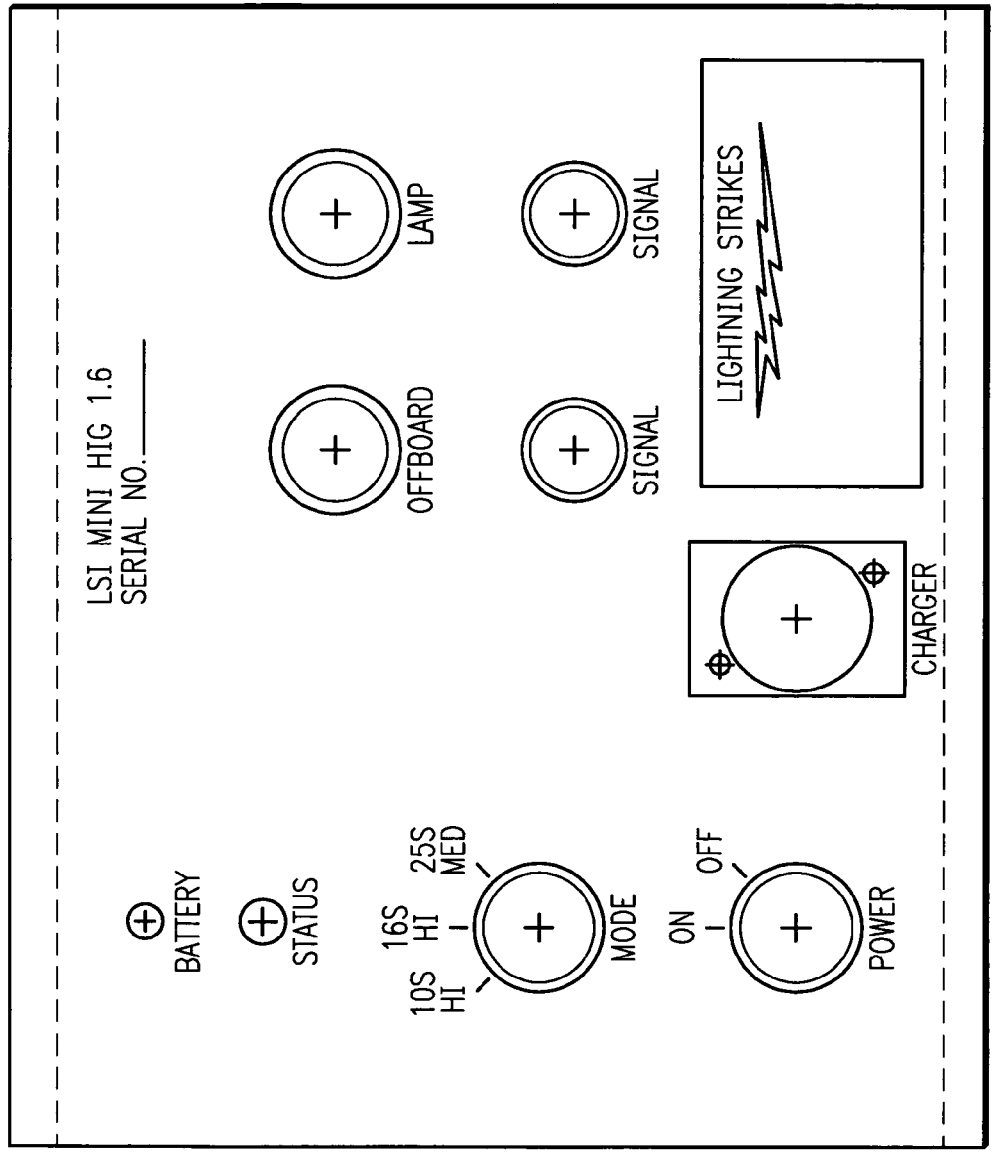
FIG. 3 is a depiction of a front panel for the onboard connectors and controls of an embodiment of the invention.

The onboard controller unit 100 takes inputs from the front panel onboard connectors, such as the version depicted in FIG. 3, and supplies outputs to the connectors. In addition, the circuit contains the onboard current-correct circuit and onboard timing circuit. The battery pack is connected to the onboard control circuit through the front panel on/off key switch. Resistors R1 and R2 along with a voltage regulator (preferably a 7812 regulator) step down the voltage of the battery pack to supply voltages for all integrated circuits (IC). The voltage of the battery pack passes through an adjustable voltage divider that sets a threshold voltage for the GOOD/BAD battery signal. The GOOD/BAD battery signal is compared (using a Boolean "And" comparator) with the I-correct signal to produce a health GOOD/BAD STATUS signal. Other circuit elements act as internal or external buffers/drivers.

The onboard timing circuit, preferably a 4541 timer, is used to set single shot timing intervals for the lamp output. The timing intervals are set by changing the clock input to the timer IC. Each clock input corresponds to a specific timing interval desired. The lamp 306 will flash, or burn, for the timing interval that is set on the front panel.

The input to the onboard current-correct circuit is the onboard current sensor, which produces a voltage proportional to the current passing through the sensor. The circuit has three comparators that correspond to the three different output levels of the lamp 306—idle, medium and high outputs. Each lamp output level generally requires a different minimum current threshold. The proper comparator is selected by a Boolean logic network and the output of the network is the I-correct signal. The I-correct signal indicates if the current through the onboard current sensor is greater than the minimum threshold for a given output level.

Figure 4:
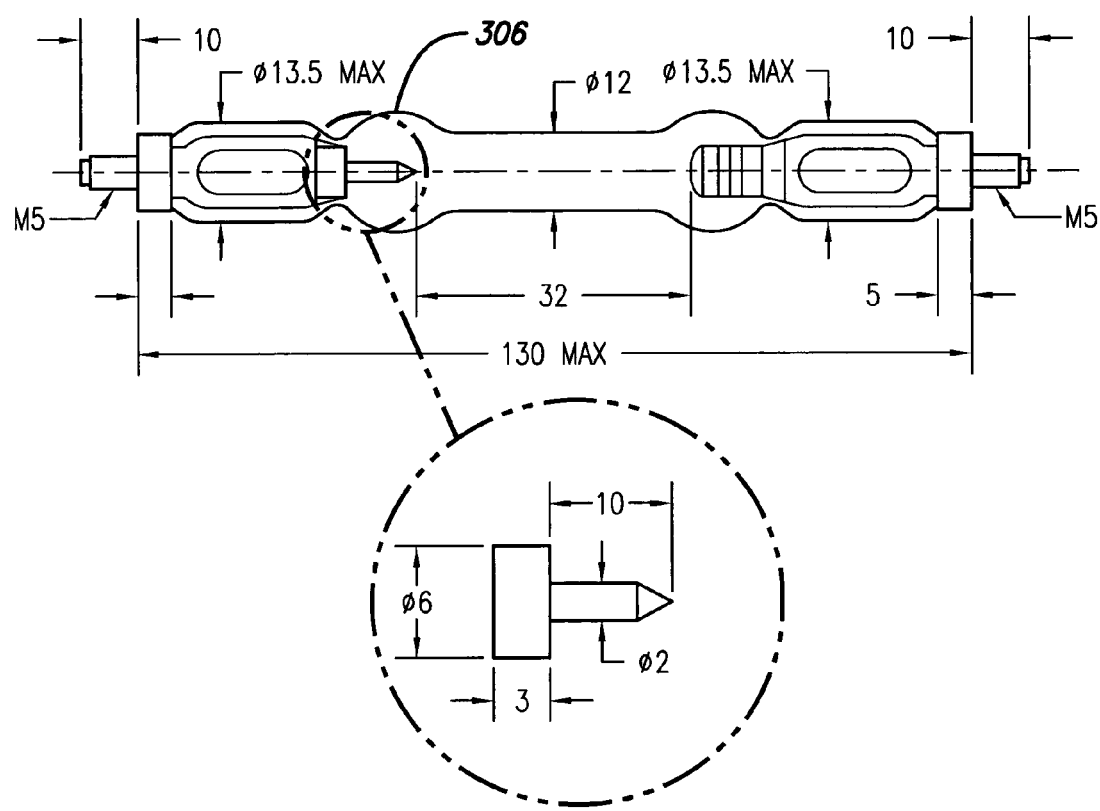
FIG. 4 shows dimensions and specifications for a lamp and cathode for an embodiment of the invention. The inset figure depicts the detail of the cathode shown in the main figure.
Figure 5:
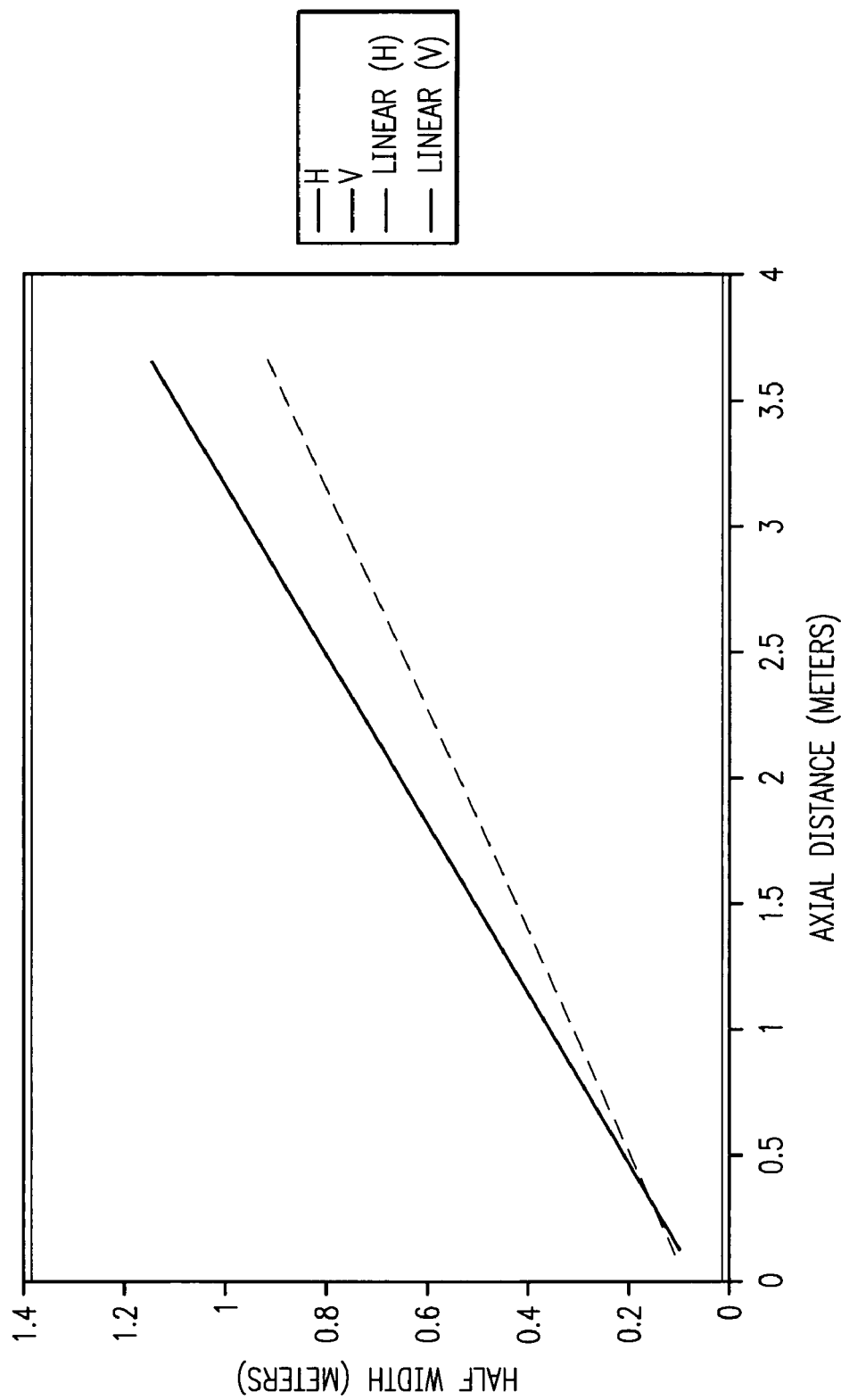
FIG. 5 is a chart depicting the light spread measured as the half width at half maximum versus axial distance for the lamp depicted in FIG. 4.
Figure 6:
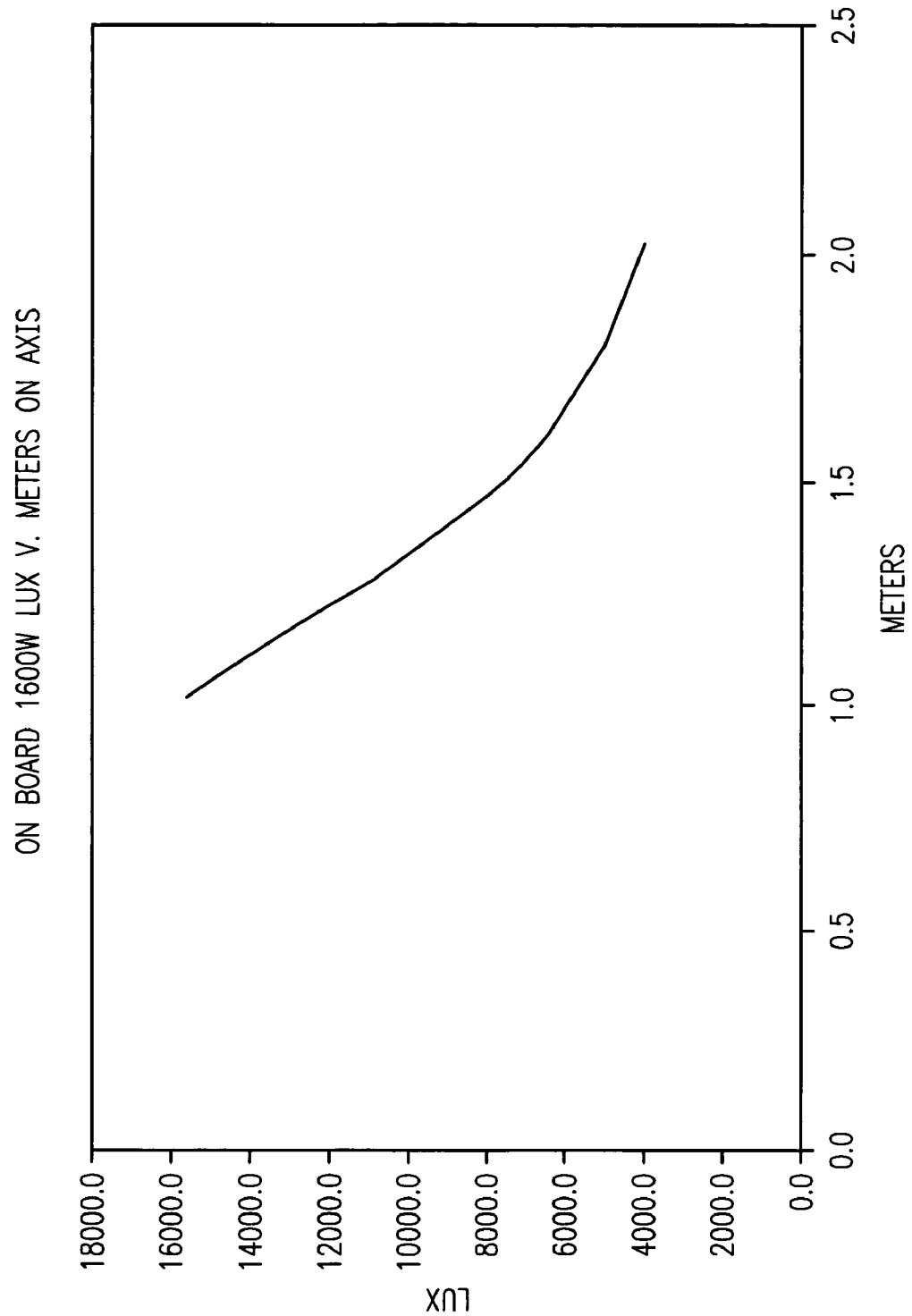
FIG. 6 is a chart depicting lux as a function of meters on axis for the lamp depicted in FIG. 4.
Figure 7:
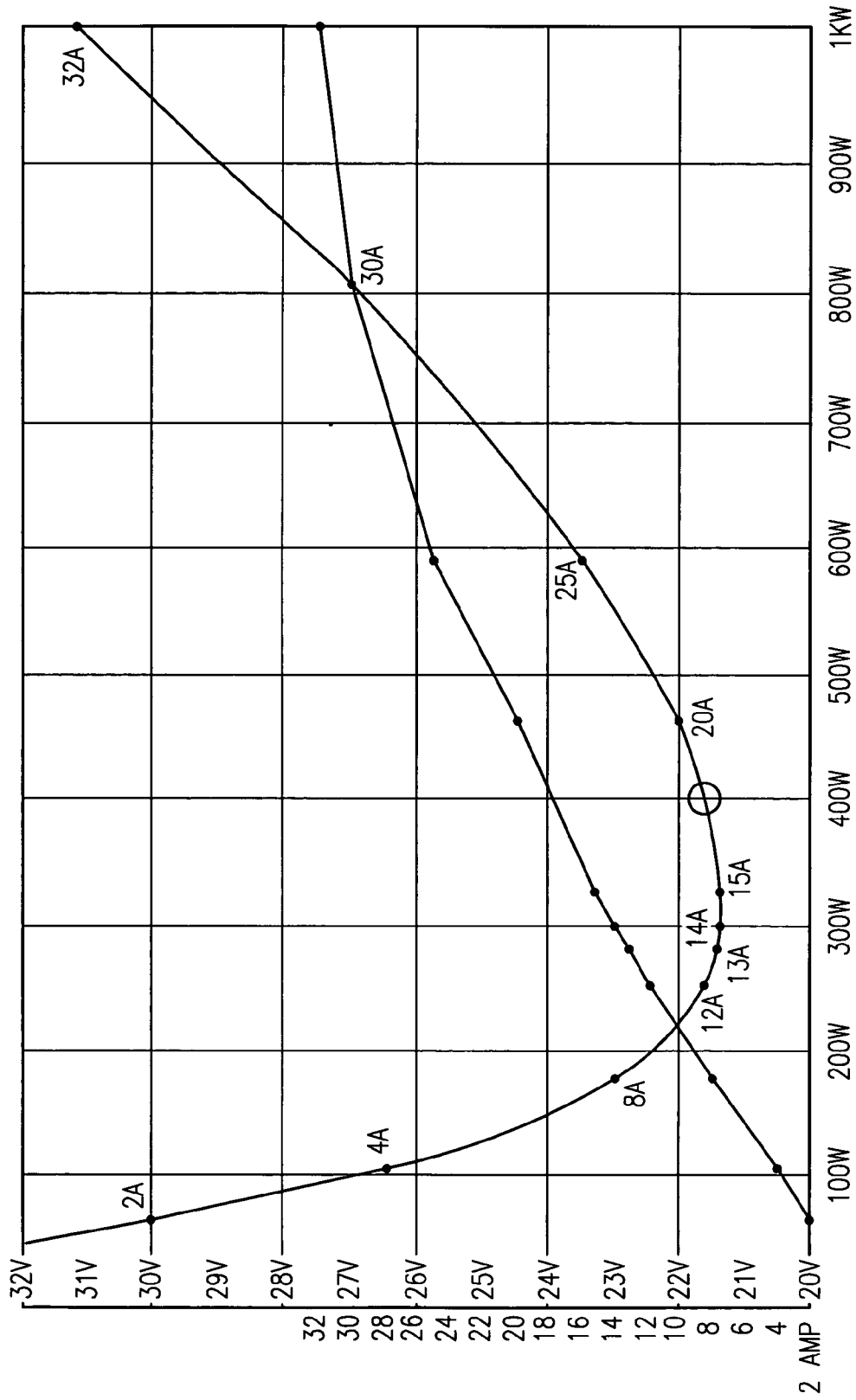
FIG. 7 is a chart depicting voltage across the lamp versus lamp power and a plot of current through the lamp as a function of power for the lamp depicted in FIG. 4.

FIG. 4 shows a version of a specification sheet for a 1600 W lamp. This lamp produces an arc that is approximately 32 mm in length. The beam pattern for the lamp is about fifty degrees horizontal and forty-five degrees vertical for a maximum illuminance at one meter of about 15,000 lux and a color temperature of 5400 K. The dimensions indicated are in millimeters (mm) and, for clarity, are shown without their manufacturing tolerances. The heavy-wall quartz has an outer diameter of about 12 mm and an inner diameter of about 6 mm. FIG. 5 shows a chart prepared from test data for a 1600 W lamp. The ordinate of the chart is the half width at half maximum (HWHM) of the lamp beam. The HWHM is slightly different for the horizontal and vertical cross section of the beam. FIG. 6 shows the power per unit area of the beam along the beam axis. The ordinate is the value of power per unit area in lux and the abscissa is the distance from the arc of the lamp 306 along the beam axis in meters. FIG. 7 shows a plot of voltage across the lamp 306 versus lamp power and a plot of current through the lamp 306 as a function of power. The voltage versus power plot forms a so-called J curve. The voltage and current supplied to the lamp 306 generally follows this characteristic J curve. It is useful to also consider the dynamic impedance of the lamp 306 along this curve. At low power levels, the lamp impedance is falling as the power level rises. Then the impedance bottoms out and begins to rise with increasing power. The current invention successfully varies the lamp output along the J curve from the very low level of output characterized by idle, to the higher levels of output characterized by medium and high levels.

Figure 8:
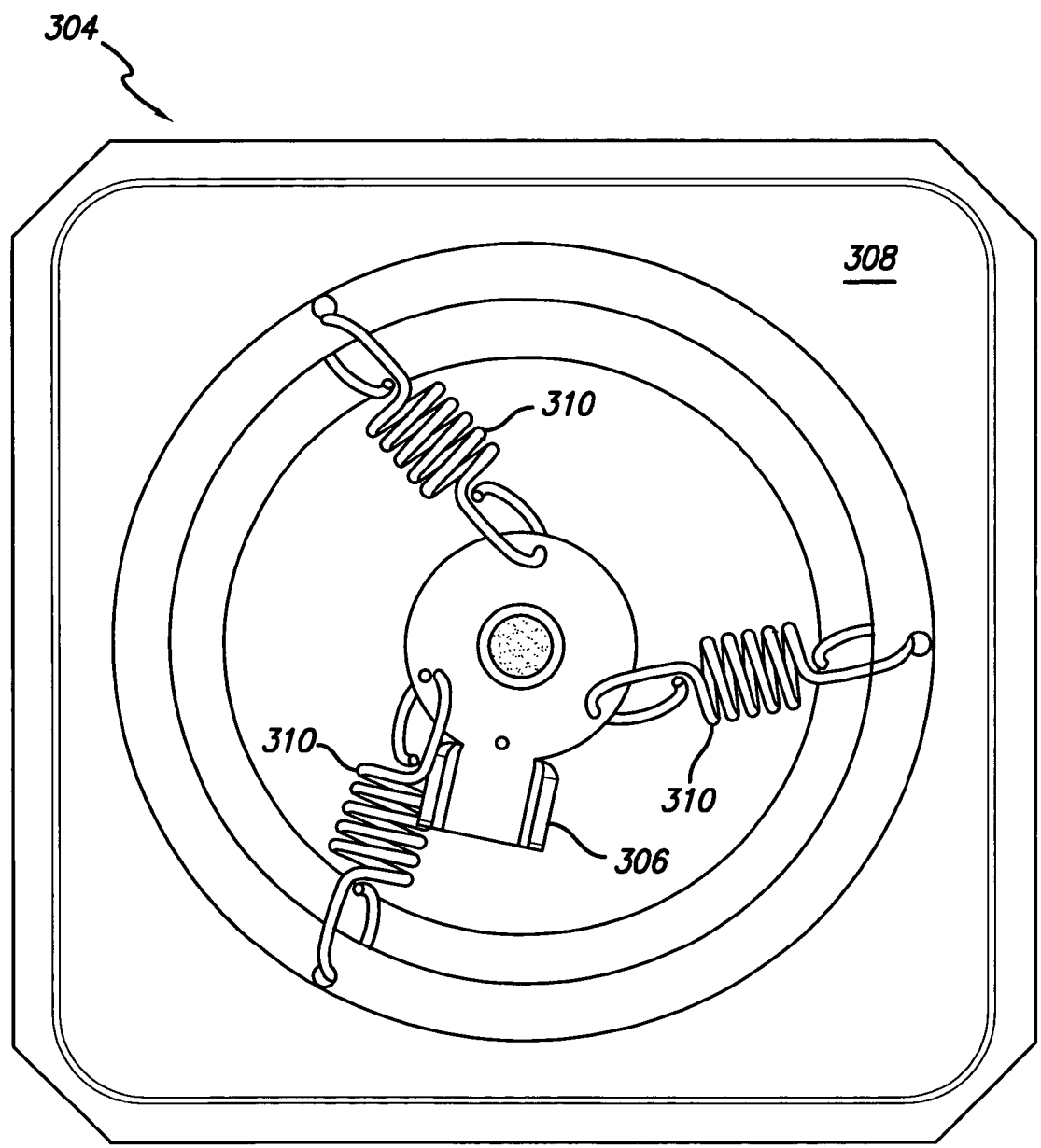
FIG. 8 is shows a mounting for the lamp in the lamp fixture for an embodiment of the invention.

FIG. 8 shows a version of the mounting of the lamp 306 in the lamp fixture 300 by way of a shock mount 304. Each lamp end is held by a ring that is connected to three springs 310. The springs 310 isolate the lamp 306 from the shock of collision in vehicle safety testing. The springs 310 also serve to limit the heat that can flow from the lamp 306 into the lamp fixture 300. Within the lamp fixture 300 is the ignitor. The ignitor is located close to the lamp 306 to minimize losses and interference from the high voltage and currents that pass through the lamp 306. In addition, the ignitor is surrounded by a metal box that is grounded and serves as a Faraday cage to shield surround equipment from electromagnetic radiation (EMI). Connected to the lamp fixture 300 is a reflector, which may be a parabolo-cylindrical reflector with side reflectors. The reflector serves to direct the light that is emitted by the lamp 306. The reflector has a parabolic projection in the plane transverse to the axial plane of the lamp 306 and a planar projection in the axial plane.

In an alternate embodiment, the shock mount is a heat-resistant elastomer.

Operation of the lamp system requires the connection of the three major system components—off-board controller unit 200, onboard controller unit 100, and lamp fixture 300—and the selection of system settings. What follows is a description of the user and internal operations of the system.

The onboard controller unit 100 is connected to a charger and the onboard batteries are charged. The onboard controller unit 100 is then removed from the charger. An off-board cable is connected to the onboard controller unit 100. A lamp cable is connected to the onboard controller unit 100 and the lamp fixture 300. The connection of these two cables makes a safety circuit connection within the off-board controller unit 200. If the cables are disconnected during operation, then the AC power to the constant current supplies is switched off by one throw of a relay, and the charging capacitor is discharged through a resistor by the other throw of a relay. The off-board controller unit 200 is plugged into a source of 120V-60 Hz line voltage and the off-board power switch is turned on. The charging capacitor is charged to a voltage of approximately 100V in a few seconds. The ignition ready light is activated. The user then pushes the ignition switch. The ignition switch closure is momentary and activates a relay to make the connection between the output of the off-board voltage booster circuit and the ignitor input and also activates a single shot relay timer that turns the control voltage on the constant current supply to maximum for 3 seconds. When the ignitor receives the initial voltage pulse from the off-board controller unit 200 it produces a 25,000 V drop across the lamp 306 to breakdown the gas in the lamp 306.

Ignition generally involves several physical processes: breakdown, boost, current pulse and arc stabilization. The 25,000 V is supplied by the ignitor within the lamp fixture 300 and the voltage is double insulated as required for safety regulations. The current supplied during this 25,000 volt pulse is minimal and the pulse lasts for milliseconds or less. Once the gas is broken down, a current can be made to flow. Initially, to get the current flowing after breakdown a boost voltage is generally required. This boost voltage is supplied by the off-board controller unit 200 and is approximately 300V. The boost voltage breaks down immediately as current begins to flow through the arc and again lasts for microseconds or less. A current pulse from the charging capacitor is then applied to the lamp 306 from the off-board controller unit 200. The pulse lasts less than a millisecond. Finally, to stabilize the arc on the anode and cathode, a 36 A current is supplied by the off-board controller unit 200 that lasts for approximately three seconds. The above is an overview of the functionality supplied by the off-board controller unit 200 in igniting and stabilizing the lamp 306.

The lamp 306 is now ignited and the onboard timing circuit relaxes to its normal state, thereby dropping the control voltage to the constant current power supply to approximately 3.5 V, which corresponds to the idle output current of about 6.5 A. The lamp 306 is now idling off of voltage and current supplied by the off-board controller unit 200. The idle power of the lamp 306 is about 130 W. The next step is to transfer power to the onboard controller unit 100. This is done prior to beginning the final test sequence of collision.

The onboard MODE switch is now positioned for the desired setting of duration/power output. The SIGNAL cable is plugged into the onboard controller unit 100. The onboard controller unit 100 is turned on at the POWER key switch and the user verifies that the battery LED is green. When the onboard is turned on, the battery checking circuitry within the onboard controller unit 100 is activated. If the battery voltage is above a preset threshold, then the LED is continuous green. Otherwise, the LED is flashing red. At this point, current and voltage are still being supplied by the off-board controller unit 200, but this voltage and current are being passed through by the initial configuration of the onboard solid state relay. The user then presses and holds the DETACH button while simultaneously withdrawing the off-board cable from the onboard receptacle. After withdrawing the off-board cable, the off-board safety circuit shuts down power to the constant current power supply and discharges the charging capacitor as previously discussed.

Once the detachment procedure is executed, the lamp 306 is running off of the onboard batteries and the onboard controller unit 100 has switched the onboard solid state relay that provides idle power levels. The current from the onboard solid state relay for the idle level passes through a current regulator or alternately passes through a current limiting resistor. This idle current then flows through the ignitor and to the lamp 306. The onboard controller unit 100 will idle the lamp 306 until the circuit receives a trigger signal from the SIGNAL connector. When the trigger signal is received, then the onboard solid state relay will switch in either the medium level voltage or the high level voltage. Preferably, the medium level voltage operates off of the 28th cell of a 37-cell battery pack, where two parallel sets of cells make up one battery pack. The high level voltage preferably operates off of the 37th cell or top cell of the battery pack. The medium flash is about 1000 W and is on for approximately 25 seconds. The high flash is about 1600 W and is on for approximately 16 seconds or 10 seconds, depending on the setting of the MODE Key Switch. During the medium or high flash, cameras are activated.

Once the test is concluded, the onboard controller unit 100 is turned off and the onboard batteries are generally recharged.

In an alternate construction, a distribution box is located off-board and is connected to multiple off-board power supplies. The distribution box combines or multiplexes the output cables of each off-board power supply into a single cable. The single cable from the off-board distribution box is connected to an onboard distribution box. The onboard distribution box de-multiplexes the single cable into a plurality of cables such that each onboard controller unit 100 (if there is more than one) receives the necessary cables from a particular off-board power supply. The purpose of said distribution box system is to power and control a plurality of onboard controller units 100 and lamp fixtures 300 from a plurality of off-board controller units 200, the onboard controller unit 100 and lamp fixtures 300 preferably having a one to one correspondence with each of the off-board controller units 200. In this configuration, the single cable has all of the conductors required by a single off-board/onboard system. In an alternate distribution box configuration, the chassis grounds may be combined into a single chassis ground conductor and the power supply returns may be combined into a single power supply return conductor. In the off-board distribution box, each of the off-board ignite buttons and function is reproduced so that the ignite functions can be controlled from the distribution box alone. Alternately, there may be a single distribution box ignite button which controls a bank of relays that replace each individual ignite button. In such a manner, all systems can be ignited from one ignite button.

While the present invention has been described with regards to particular embodiments, it is recognized that additional variations of the present invention may be devised without departing from the inventive concept. For example, although the bulk of the description is devoted to describing a 1600 watt mini high-G lamp, the power of the lamp could range from about 1000 watts and higher. Furthermore, it is contemplated that the concepts presented could also be applied to other bulb types, such as a portable auxiliary light (PAL) and overhead or gantry lights.

The PAL light has a nearly circular (approximately 340 degrees) bulb and a power of preferably around 15,000 watts and 30,000 watts, though the power could range between about 5000 watts to 50,000 watts. The gap between the ends of the nearly circular bulb accommodates two legs, and electrodes drop down with the two legs and contain the cathode and anode. This lamp can be further strengthened by adding a third "dummy" leg. The circular lamp has some optical advantages in that it wraps light around a subject and fills in shadow areas to give a very accurate view of the subject. Normally several lights would have to be used to get this kind of full accurate un-shadowed view. This lamp can also be used for static testing where the lamp is not subjected to any G forces. It still enjoys a vast range of high to low with a ratio of more than 40 to 1. As such, it provides very little heat on the subject, yet it is ready to go to high in less than one millisecond.

The overhead or gantry lights range from about 100,000 watts to 800,000 watts. Such large linear lamps are generally used for wide area overhead lighting. These lamps may idle as low as 1000 to 4000 watts, and in a few milliseconds can climb to high levels of 100,000 to 800,000 watts which can be sustained for around ten to thirty seconds. This represents a maximum high to low ratio of 800 to 1.

INDUSTRIAL APPLICABILITY

This invention may be industrially applied to the manufacturing and use of lighting systems for high speed video, particularly, of lighting systems used to capture images in vehicle safety tests.

What is claimed is:

1. A vehicle testing lamp system comprising:
   (a) one or more onboard controller units comprising:
   an onboard solid state relay, the onboard solid state relay being switchable between an idle output power setting and a high output power setting, electrically connected to an onboard timing circuit, electrically connected to an onboard transfer circuit, electrically connected to an onboard current sensor, electrically connected to an onboard current regulator, electrically connected to onboard batteries, the onboard batteries providing electrical power to the onboard solid state relay, onboard timing circuit, onboard transfer circuit, onboard current sensor, and onboard current regulator,
   (b) one or more off-board controller units comprising:
   an off-board power supply electrically connected to an off-board voltage booster circuit; and;
   (c) one or more lamp fixtures comprising:
      (i) a lamp, the lamp being positioned within a shock mount and being electrically connected to an igniter, the lamp comprising a long arc xenon lamp,
      (ii) the ignitor being closed in a Faraday cage, and
      (iii) the shock mount having a first shock ring, a second shock ring, and a plurality of springs, the first shock ring encircling a first end of the lamp and the second shock ring encircling a second end of the lamp, wherein at least three of the plurality of springs position the first end of the lamp essentially centrally within the first shock ring and at least three of the plurality of springs position the second end of the lamp essentially centrally within the second shock ring, and
   wherein the off-board controller unit supplies power to the lamp at the idle output level, wherein the onboard transfer circuit permits the off-board power supply to be disconnected while the onboard controller unit maintains the lamp at the idle output level, wherein the onboard current regulator limits the amount of current to the lamp when the onboard solid state relay is in the idle output power setting, wherein the onboard timing circuit limits the time that the lamp remains at the high output level following receipt of a trigger pulse, and wherein the onboard controller unit has a maximum weight of about eleven kilograms.

2. The vehicle testing lamp system of claim 1 wherein:
   (a) the one or more off-board power supplies comprises a plurality of off-board power supplies;
   (b) the one or more onboard controller units comprises a plurality of onboard controller units;
   (c) the one or more lamp fixtures comprises a plurality of lamp fixtures, wherein one lamp fixture is connected to one onboard controller unit;
   (d) an off-board distribution box, the off-board distribution box combining a plurality of output cables from the plurality of off-board power supplies into a single cable; and
   (e) an onboard distribution box connected to the off-board distribution box by the single cable, the onboard distribution box de-multiplexing the single cable into a plurality of cables, one cable for each onboard controller unit of the plurality of onboard controller units, wherein the off-board distribution box, onboard distribution box, and single cable define a distribution box system;
   wherein the distribution box system transmits electrical power from the plurality of off-board power supplies to the plurality of onboard controller units for operating the plurality of lamp fixtures.

3. A vehicle testing lamp system comprising an onboard controller unit having:
   (a) an onboard relay, the onboard relay being switchable between an idle output power setting and a high output power setting;
   (b) an onboard timing circuit electrically connected to the onboard relay;
   (c) an onboard transfer circuit electrically connected to the onboard timing circuit:
   (d) an onboard current sensor electrically connected to the onboard transfer circuit;
   (e) an onboard current regulator electrically connected to the onboard current sensor;
   (f) an auxiliary power supply electrically connected to the onboard current regulator, the auxiliary power supply providing electrical power to the onboard relay, onboard timing circuit, onboard transfer circuit, onboard current sensor, and onboard current regulator.

4. The vehicle testing lamp system of claim 3, the onboard relay comprising a plurality of solid state relays.

5. The vehicle testing lamp system of claim 3, the auxiliary power supply comprising one or more batteries.

6. The vehicle testing lamp system of claim 3, the auxiliary power supply comprising one or more ultra-capacitors.

7. The vehicle testing lamp system of claim 3, the auxiliary power supply being off-board of a vehicle under test and being electrically connected to the onboard controller unit by an electrical cable.

8. The vehicle testing lamp system of claim 3, further comprising an off-board controller unit having an off-board power supply electrically connected to an off-board voltage booster circuit.

9. The vehicle testing lamp system of claim 8 further comprising a lamp fixture having a lamp, the lamp being electrically connected to an igniter, wherein the off-board controller supplies power to the lamp at the idle output level, wherein the onboard transfer circuit permits the off-board power supply to be disconnected while the onboard controller unit maintains the lamp at the idle output level, wherein the onboard current regulator limits the amount of current to the lamp when the onboard relay is in the idle output power setting, and wherein the onboard timing circuit limits the time that the lamp remains at the high output level following receipt of a trigger pulse.

10. The vehicle testing lamp system of claim 9, the lamp comprising a long arc xenon lamp.

11. The vehicle testing lamp system of claim 9, the lamp comprising a nearly circular bulb and a power of between 5000 watts and 50,000 watts.

12. The vehicle testing lamp system of claim 9, the lamp comprising a linear gantry light, the gantry light having a power between 100,000 watts and 800,000 watts.

13. The vehicle testing lamp system of claim 9, the ignitor being closed in a Faraday cage.

14. The vehicle testing lamp system of claim 9, the lamp fixture further comprising a shock mount, the lamp being positioned within the shock mount.

15. The vehicle testing lamp system of claim 14, the shock mount comprising a first shock ring, a second shock ring, and a plurality of springs, the first shock ring encircling a first end of the lamp and the second shock ring encircling a second end of the lamp, wherein at least three of the plurality of springs position the first end of the lamp essentially centrally within the first shock ring and at least three of the plurality of springs position the second end of the lamp essentially centrally within the second shock ring.

16. The vehicle testing lamp system of claim 14, the shock mount comprising a heat-resistant elastomer.

17. The vehicle testing lamp system of claim 14 wherein the ratio of lumens output to kilogram mass of the onboard controller unit and the lamp fixture is greater than 5500.

18. The vehicle testing lamp system of claim 9, the lamp having negative pressure inside the lamp bulb such that the lamp does not explode upon failure.

19. The vehicle testing lamp system of claim 9, the lamp having a constant color temperature between 5000 and 6000 Kelvin.

20. The vehicle testing lamp system of claim 9 further comprising:
(a) a plurality of off-board power supplies;
(b) a plurality of onboard controller units;
(c) a plurality of lamp fixtures, wherein one lamp fixture is connected to one onboard controller unit; and
(d) means for transmitting electrical power from the plurality of off-board power supplies to the plurality of onboard controller units for operating the plurality of lamp fixtures.

21. A lamp for use in a lighting system for high speed image capture, the lamp comprising a long arc xenon lamp positioned within a light fixture by means for isolating the long arc xenon lamp from the shock of collision in vehicle safety testing, the isolating means comprising a first shock rind, a second shock ring, and a plurality of springs, the first shock ring encircling a first end of the long arc xenon lamp and the second shock ring encircling a second end of the long arc xenon lamp, wherein at least three of the plurality of springs position the first end of the long arc xenon lamp centrally within the first shock ring and at least three of the plurality of springs position the second end of the long arc xenon lamp centrally within the second shock ring.

22. A method for lighting a subject for high speed image capture, the method comprising the steps of (a) providing a system comprising;
  (i) an onboard controller unit comprising an onboard solid state relay, the onboard solid state relay being switchable between an idle output power setting and a high output power setting; an onboard timing circuit; an onboard transfer circuit; an onboard current sensor; an onboard current regulator; and an auxiliary power supply, the auxiliary power supply providing electrical power to the onboard solid state relay, onboard timing circuit, onboard transfer circuit, onboard current sensor, and onboard current regulator; wherein the onboard solid state relay, onboard timing circuit, onboard transfer circuit, onboard current sensor, onboard current regulator, and auxiliary power supply are electrically connected;
  (ii) an off-board controller unit comprising an off-board power supply, electrically connected to an off-board voltage booster circuit; and
  (iii) a lamp fixture comprising an ignitor, the ignitor being closed in a Faraday cage; and a lamp, the lamp being electrically connected to the igniter;
    wherein the off-board controller supplies power to the lamp at its low (idle) output level, wherein the onboard transfer circuit permits the off-board power supply to be disconnected while the onboard controller unit maintains the lamp at idle, and wherein the onboard timing circuit limits the time that the lamp remains at high output;
(b) igniting the lamp by the steps of:
  (i) applying a 25,000 V pulse to the lamp by the combination of the off-board power supply and the onboard ignitor;
  (ii) applying a boost voltage to the lamp, the boost voltage being approximately 300V and being supplied by the off-board controller unit;
  (iii) applying a current pulse to the lamp, the current pulse being from a large capacitance source in the off-board controller unit; and
  (iv) applying a stabilizing current of about 36 A to the lamp by the off-board controller unit, the stabilizing current lasting for approximately three seconds;
(c) supplying idle power to the lamp at an idle output level by the off-board controller unit;
(d) disconnecting the off-board controller unit from the onboard controller unit by way of the onboard transfer circuit, the onboard transfer circuit allowing the off-board power supply to be disconnected while the onboard controller unit maintains the lamp at idle;
(e) powering the onboard controller unit by way of the auxiliary power supply;
(f) receiving a trigger pulse by the onboard timing circuit to signal the lamp to go to high output level, onboard timing circuit limiting the time that the lamp remains at high output;
(g) signaling the onboard solid state relay to supply high output power to the lamp, the lamp thereby lighting the subject; and
(h) returning the lamp to idle after a prescribed lamp flash time.

23. The method of claim 22, further comprising the step of recharging the auxiliary power supply following returning the lamp to idle after a prescribed lamp flash time.

* * * * *